US012638790B2

(12) United States Patent
Kamijo et al.

(10) Patent No.: US 12,638,790 B2
(45) Date of Patent: May 26, 2026

(54) ELECTROSTATIC CHARGE IMAGE DEVELOPING TONER, ELECTROSTATIC CHARGE IMAGE DEVELOPER, TONER CARTRIDGE, PROCESS CARTRIDGE, AND IMAGE FORMING APPARATUS

(71) Applicant: FUJIFILM Business Innovation Corp., Tokyo (JP)

(72) Inventors: Yukiko Kamijo, Kanagawa (JP); Yosuke Tsurumi, Kanagawa (JP); Moegi Iguchi, Kanagawa (JP); Yuka Ishihara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 562 days.

(21) Appl. No.: 18/188,440

(22) Filed: Mar. 22, 2023

(65) Prior Publication Data

US 2024/0094654 A1 Mar. 21, 2024

(30) Foreign Application Priority Data

Sep. 6, 2022 (JP) ................................ 2022-141718

(51) Int. Cl.

*G03G 9/08* (2006.01)
*G03G 9/097* (2006.01)
*G03G 21/18* (2006.01)

(52) U.S. Cl.

CPC ....... *G03G 9/09725* (2013.01); *G03G 9/0819* (2013.01); *G03G 9/09716* (2013.01); *G03G 21/1814* (2013.01)

(58) Field of Classification Search

CPC .......... G03G 9/09708; G03G 9/09716; G03G 9/09725

See application file for complete search history.

(56) References Cited

U.S. PATENT DOCUMENTS 10,599,061 B1 3/2020 Kakehi et al.
2005/0026089 A1* 2/2005 Ogawa ................. C09C 1/3684 430/405
2010/0196817 A1* 8/2010 Sasaki .................... G03G 15/08 525/437
2022/0128914 A1 4/2022 Omokawa et al.

FOREIGN PATENT DOCUMENTS

| | | | | |
|---|---|---|---|---|
| EP | 1237048 | | 9/2002 | |
| JP | 2007-114630 | * | 5/2007 | .............. G03G 9/08 |
| JP | 2013117564 | | 6/2013 | |
| JP | 2014-074905 | * | 4/2014 | .......... G03G 9/0806 |
| JP | 2016167029 | | 9/2016 | |
| JP | 2020142959 | | 9/2020 | |
| JP | 2020154258 | | 9/2020 | |

OTHER PUBLICATIONS

Translation of JP 2007-114630.*
Translation of JP 2014-074905.*
"Search Report of Europe Counterpart Application", issued on Jan. 19, 2024, p. 1-p. 6.

* cited by examiner

*Primary Examiner* — Peter L Vajda
(74) *Attorney, Agent, or Firm* — JCIPRNET

(57) ABSTRACT

An electrostatic charge image developing toner contains alkylsilane-treated silica particles, cyclic siloxane, and toner particles.

19 Claims, 2 Drawing Sheets

ELECTROSTATIC CHARGE IMAGE DEVELOPING TONER, ELECTROSTATIC CHARGE IMAGE DEVELOPER, TONER CARTRIDGE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2022-141718 filed Sep. 6, 2022.

BACKGROUND

(i) Technical Field

The present invention relates to an electrostatic charge image developing toner, an electrostatic charge image developer, a toner cartridge, a process cartridge, and an image forming apparatus.

(ii) Related Art

JP2020-142959A proposes "a hydrophobic silica powder having a particle size ($D_{50}$) as measured by a laser diffraction method of 300 nm or less, a particle size distribution index ($D_{90}/D_{10}$) of 3.0 or less, a hydrophobicity of 60% by volume or more, and an organic acid content of 1 to 300 ppm".

SUMMARY

Aspects of non-limiting embodiments of the present disclosure relate to an electrostatic charge image developing toner that contains alkylsilane-treated silica particles and toner particles, in which, compared to a toner containing no cyclic siloxane, defective cleaning of an image holder in a case where an image having a high image density (for example, an image density of 90% or more) is formed continuously and at high speed is suppressed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for achieving the above object include the following means.

According to an aspect of the present disclosure, there is provided an electrostatic charge image developing toner containing: alkylsilane-treated silica particles, cyclic siloxane, and toner particles.

BRIEF DESCRIPTION OF THE DRAWINGS

Exemplary embodiment(s) of the present invention will be described in detail based on the following figures, wherein.

DETAILED DESCRIPTION

Figure 1:
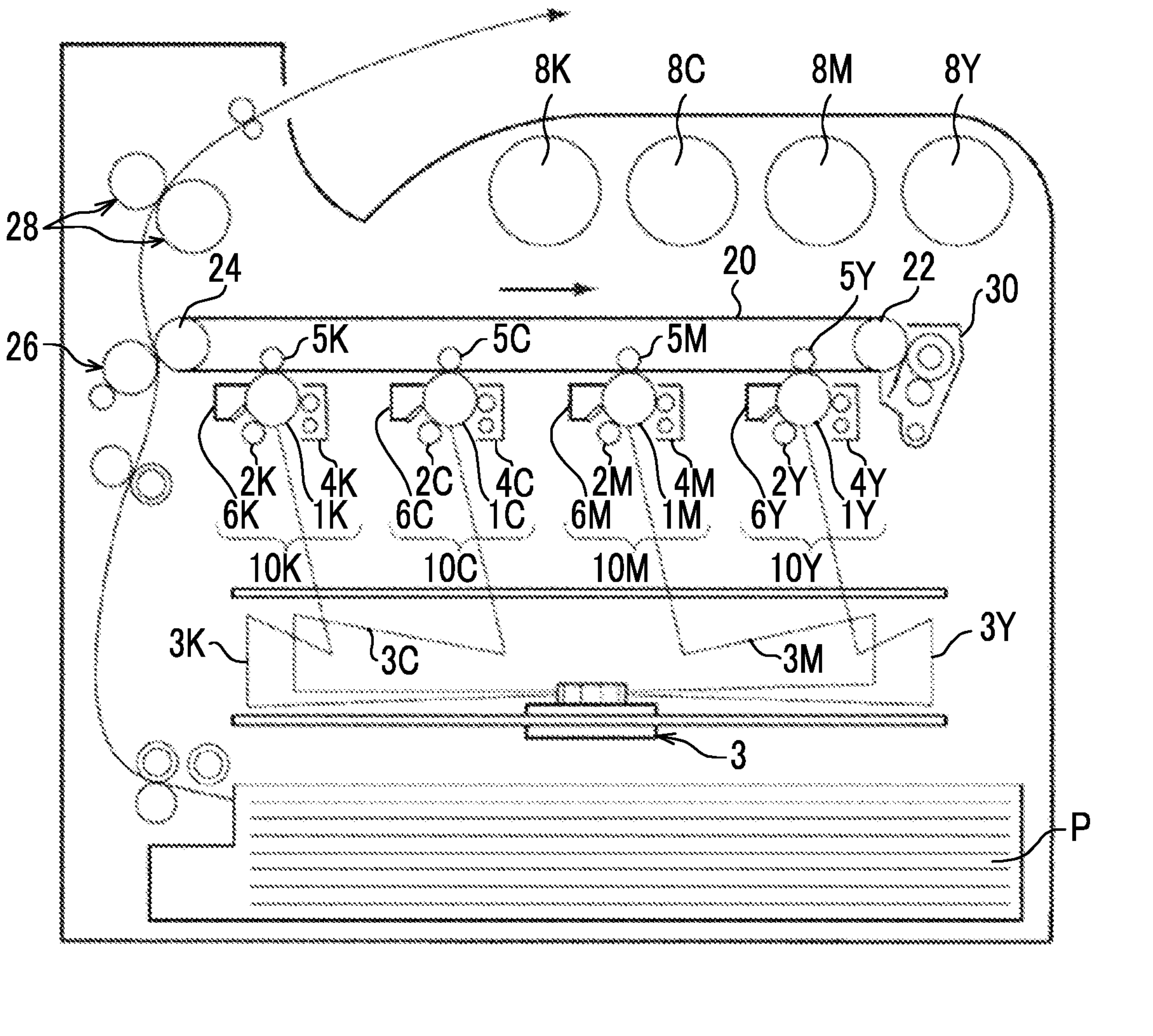
FIG. 1 is a view schematically showing the configuration of an image forming apparatus according to the present exemplary embodiment.

The exemplary embodiments as an example of the present invention will be described below. The following descriptions and examples merely illustrate the exemplary embodiments, and do not limit the scope of the invention.

Regarding the numerical ranges described in stages in the present specification, the upper limit or lower limit of a numerical range may be replaced with the upper limit or lower limit of another numerical range described in stages. Furthermore, in the present specification, the upper limit or lower limit of a numerical range may be replaced with values described in examples.

Each component may include a plurality of corresponding substances.

In a case where the amount of each component in a composition is mentioned, and there are two or more kinds of substances corresponding to each component in the composition, unless otherwise specified, the amount of each component means the total amount of two or more kinds of the substances present in the composition.

Electrostatic Charge Image Developing Toner

The electrostatic charge image developing toner (hereinafter, also referred to as a "toner") according to the present exemplary embodiment contains alkylsilane-treated silica particles, cyclic siloxane, and toner particles.

With the above-described configuration of the toner according to the present exemplary embodiment, defective cleaning of an image holder in a case where an image having a high image density is formed continuously and at high speed is suppressed. The reason is presumed as follows.

From the viewpoint of fluidity of a toner, charge control for a toner, and cleaning maintainability, hydrophobic silica particles may be used as an external additive. The externally added silica particles are released from the toner particles by a mechanical load caused by agitating in the developing unit, scraping at a cleaning nip portion, or the like. In a case where the silica particles released from the toner particles reach the cleaning nip portion, the silica particles are blocked at a tip of the cleaning nip portion (part downstream of a contact portion between a cleaning blade and an image holder in a rotational direction of the image holder), and pressure from the cleaning blade causes the external additive to stay between the cleaning blade and the image holder (hereinafter, the retention of the external additive is referred to as an "external additive dam"), thereby improving toner scraping performance. Therefore, the occurrence of slip-through of the toner from the cleaning nip portion (defective cleaning) is suppressed, and cleanability can be maintained. Here, the cleaning maintainability (maintenance of suppressing the defective cleaning) is affected by a strength of the external additive dam.

In order to improve the cleaning maintainability, a linear silicone oil may be added to the above-described silica particles. However, in a case where an image having a high image density is formed continuously and at high speed, an amount of the linear silicone oil supplied to the external additive dam may be too large, so that the strength of the external additive dam may increase too much. It is considered that this is because the linear silicone oil is likely to be released from the silica particles in a case where the pressure is applied from the cleaning blade. On this occasion, in the case where an image having a high image density is formed continuously and at high speed, since an amount of untransferred toner remaining on an image holder increases, a large amount of the untransferred toner reaches the cleaning nip portion, and the amount of toner blocked by the external additive dam increases. Therefore, microvibration of the cleaning blade may occur during image formation, causing toner to slip through the cleaning nip portion, that is, causing the defective cleaning.

In addition, in a case where the strength of the external additive dam is weak, in the formation of an image having a high image density continuously and at high speed, since an amount of untransferred toner remaining on an image holder increases, a large amount of the untransferred toner reaches the cleaning nip portion, the external additive dam may collapse, causing toner to slip through the cleaning nip portion, that is, causing the defective cleaning.

The toner according to the present exemplary embodiment contains cyclic siloxane together with the alkylsilane-treated silica particles. By configuring the toner according to the present exemplary embodiment, the cyclic siloxane is released from the toner particles together with the alkylsilane-treated silica particles and reaches the cleaning nip portion. In addition, in the case where an image having a high image density is formed continuously and at high speed, due to the pressure from the cleaning blade, the cyclic siloxane is released moderately and continuously from the alkylsilane-treated silica particles, without being released at once with a large amount. It is considered that this is because a cyclic portion of the cyclic siloxane is likely to be entangled with the alkyl group in the alkylsilane-treated silica particles.

Therefore, it is considered that, in the case where an image having a high image density is formed continuously and at high speed, the amount of the cyclic siloxane supplied to the external additive dam is continuously maintained at a moderate level, so that the strength of the external additive dam is easily maintained at an appropriate level, improving the cleaning maintainability.

From the above, with the toner according to the present exemplary embodiment, it is presumed that defective cleaning of an image holder in a case where an image having a high image density is formed continuously and at high speed is suppressed.

Alkylsilane-Treated Silica Particles

The toner according to the present exemplary embodiment contains alkylsilane-treated silica particles.

The alkylsilane-treated silica particles are silica particles subjected to a surface treatment with an alkylsilane.

Hereinafter, the silica particles to be subjected to a surface treatment with an alkylsilane may be silica, that is, particles containing $SiO_2$ as a main component. In the present specification, the "main component" refers to a component that occupies equal to or more than 50% by mass of the total mass of a mixture of a plurality of kinds of components.

The alkylsilane is a silicon compound having an alkyl group that is directly bonded to a silicon atom.

The number of carbon atoms in the alkyl group of the alkylsilane is, for example, preferably 1 or more and 3 or less, more preferably 1 or more and 2 or less, and even more preferably 1.

The alkylsilane is, for example, preferably a silicon compound having an alkyl group and an alkoxy group, and more preferably a compound including an alkyl group, an alkoxy group, and a silicon atom.

A numerical range of the number of carbon atoms in the alkoxy group is the same as the numerical range of the number of carbon atoms in the alkyl group of the alkylsilane.

The number of alkyl groups in the alkylsilane is, for example, preferably 1 or more and 3 or less, more preferably 1 or 3, and even more preferably 3, per silicon atom.

The number of alkoxy groups contained in the alkylsilane is, for example, preferably 1 or more and 3 or less, more preferably 1 or 3, and even more preferably 1, per silicon atom.

The alkylsilane is, for example, preferably at least one kind of compound selected from the group consisting of alkylsilanes represented by Formula (1), Formula (2), and Formula (3).

Formula (1)

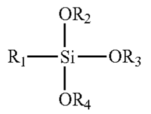

Formula (2)

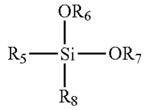

Formula (3)

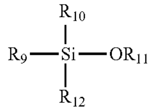

In Formula (1) to Formula (3), $R_1$ to $R_{12}$ each independently represent an alkyl group having 1 or more and 3 or less carbon atoms.

A numerical range of the number of carbon atoms in the alkyl group represented by $R_1$ to $R_{12}$ is the same as the numerical range of the number of carbon atoms in the alkyl group of the alkylsilane.

In Formula (1), for example, $R_1$ to $R_4$ preferably each represent at least one kind of group selected from the group consisting of a methyl group, an ethyl group, and a propyl group, and more preferably all represent a methyl group.

In Formula (2), for example, $R_5$ to $R_8$ preferably each represent at least one kind of group selected from the group consisting of a methyl group, an ethyl group, and a propyl group, and more preferably all represent a methyl group.

In Formula (3), for example, $R_9$ to $R_{12}$ preferably each represent at least one kind of group selected from the group consisting of a methyl group, an ethyl group, and a propyl group, and more preferably all represent a methyl group.

By adopting, as the alkylsilane, at least one compound selected from the group consisting of alkylsilanes represented by Formula (1) to Formula (3), the defective cleaning of an image holder in a case where an image having a high image density is formed continuously and at high speed is further suppressed.

It is presumed that this is because the alkylsilane represented by Formula (1) to Formula (3) is easily entangled with the cyclic portion of the cyclic siloxane.

From the viewpoint of further suppressing the defective cleaning, for example, the alkylsilane is preferably the alkylsilane represented by Formula (1) or Formula (3), and more preferably the alkylsilane represented by Formula (3).

It is preferable that all the alkyl groups of the alkylsilanes represented by Formula (1) to Formula (3) are, for example, methyl groups.

In a case where all the alkyl groups of the alkylsilanes represented by Formula (1) to Formula (3) are methyl groups, since steric hindrance is small, the treatment is easily and uniformly performed on the silica particles, and the alkylsilane is easily entangled with the cyclic portion of the cyclic siloxane. Therefore, since the cyclic siloxane is released moderately and continuously, without being released at once with a large amount, it is presumed that the defective cleaning of an image holder in a case where an image having a high image density is formed continuously and at high speed is further suppressed.

The content of the alkylsilane-treated silica particles with respect to the mass of the toner particles is, for example, preferably 0.01% by mass or more and 10% by mass or less, more preferably 0.05% by mass or more and 5% by mass or less, and even more preferably 0.1% by mass or more and 3% by mass or less.

Manufacturing Method of Alkylsilane-Treated Silica Particles

The alkylsilane-treated silica particles are manufactured through manufacturing of silica base particles and alkylsilane treatment.

Manufacturing of Silica Base Particles

It is preferable that silica base particles are manufactured, for example, by a wet method.

The "wet method" is different from a gas phase method and is a manufacturing method performed by neutralizing sodium silicate with a mineral acid or hydrolyzing an alkoxysilane.

It is preferable that the silica base particles are manufactured, for example, by a sol-gel method among wet methods.

Hereinafter, as a manufacturing method of the silica base particles, a sol-gel method will be described for example.

The manufacturing method of the silica base particles is not limited to the sol-gel method.

The particle size of the silica base particles can be freely controlled by the hydrolysis of the sol-gel method, the weight ratio of alkoxysilane, ammonia, alcohol, and water in a polycondensation step, the reaction temperature, the stirring rate, and the supply rate.

Hereinafter, the manufacturing method of the silica base particles by the sol-gel method will be specifically described.

That is, while being heated, tetramethoxysilane is added dropwise and stirred in the presence of water and alcohol, by using aqueous ammonia as a catalyst. Next, the solvent is removed from the silica sol suspension obtained by the reaction, followed by drying, thereby obtaining target silica base particles.

Alkylsilane Treatment

Examples of the alkylsilane treatment method include a method of using supercritical carbon dioxide and dissolving an alkylsilane in the supercritical carbon dioxide such that the alkylsilane adheres to the surface of silica base particles; a method of applying a solution, which contains an alkylsilane and a solvent dissolving the alkylsilane, to the surface of the silica base particles in the air (for example, by spraying or coating) such that the alkylsilane adheres to the surface of the silica base particles; and a method of adding a solution, which contains an alkylsilane and a solvent dissolving the alkylsilane, to a silica base particle dispersion in the air, keeping the obtained mixed solution as it is, and then drying the mixed solution of the silica base particle dispersion and the solution.

Cyclic Siloxane

The toner according to the present exemplary embodiment contains cyclic siloxane.

The cyclic siloxane refers to a compound having a cyclic structure including a plurality of siloxane units.

Here, the siloxane unit refers to a constitutional unit represented by Formula (4).

Formula (4)

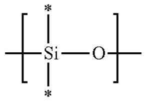

In Formula (4), * represents a bonding site.

A functional group bonded to the bonding site represented by * is not particularly limited, and examples thereof include a hydrogen atom, a hydrocarbon group, a phenyl group, and a group containing a polyether.

From the viewpoint of further suppressing the defective cleaning, for example, the functional group bonded to the bonding site represented by * is preferably a hydrocarbon group and more preferably an alkyl group.

From the viewpoint of further suppressing the defective cleaning, for example, the functional group bonded to the bonding site represented by * is preferably a methyl group, an ethyl group, or a propyl group, and more preferably a methyl group.

The functional groups bonded to the bonding site represented by * may be the same or different from each other.

The number of siloxane units constituting the cyclic structure of the cyclic siloxane is, for example, preferably 3 or more and 6 or less, more preferably 4 or more and 6 or less, and even more preferably 5 or more and 6 or less.

By setting the number of siloxane units constituting the cyclic structure of the cyclic siloxane to 3 or more and 6 or less, the defective cleaning of an image holder in a case where an image having a high image density is formed continuously and at high speed is further suppressed. The reason is presumed as follows.

By setting the number of siloxane units constituting the cyclic structure of the cyclic siloxane to 3 or more, the ring structure of the cyclic siloxane is stabilized, and the cyclic portion of the cyclic siloxane is easily entangled with the alkyl group in the alkylsilane-treated silica particles. Therefore, it is considered that the release of the cyclic siloxane from the alkyl silane-treated silica particles is moderately suppressed. In addition, by setting the number of siloxane units constituting the cyclic structure of the cyclic siloxane to 6 or less, a degree of freedom of the ring structure of the cyclic siloxane is moderately suppressed and the cyclic portion has an appropriate size, and the cyclic portion of the cyclic siloxane is easily entangled with the alkyl group in the alkylsilane-treated silica particles. Therefore, the release of the cyclic siloxane from the alkylsilane-treated silica particles is moderately suppressed.

For example, it is preferable that the number of siloxane units constituting the cyclic structure of the cyclic siloxane is 3 or more and 6 or less, and the siloxane unit has a methyl group. That is, for example, it is preferable that the cyclic siloxane having 3 or more and 6 or less siloxane units constituting the cyclic structure of the cyclic siloxane has a methyl group.

In a case where the cyclic siloxane having 3 or more and 6 or less siloxane units constituting the cyclic structure of the cyclic siloxane has a methyl group, the defective cleaning of an image holder in a case where an image having a high image density is formed continuously and at high speed is further suppressed. The reason is presumed as follows.

In a case where the cyclic siloxane having 3 or more and 6 or less siloxane units constituting the cyclic structure of the cyclic siloxane includes a methyl group, the steric hindrance is reduced compared to a case of including an ethyl group, a propyl group, or the like, and the cyclic structure of the cyclic siloxane is easily entangled with the alkyl group in the alkylsilane-treated silica particles. Therefore, the release of the cyclic siloxane is moderately suppressed.

Examples of the cyclic siloxane include hexamethylcyclotrisiloxane and dodecamethylcyclohexanesiloxane, and from the viewpoint of further suppressing the defective cleaning, the cyclic siloxane is, for example, preferably dodecamethylcyclohexanesiloxane.

The cyclic siloxane is preferably contained, for example, in the alkylsilane-treated silica particles.

In a case where the cyclic siloxane is contained in the alkylsilane-treated silica particles, the defective cleaning of an image holder in a case where an image having a high image density is formed continuously and at high speed is further suppressed.

In a case where the cyclic siloxane is contained in the alkylsilane-treated silica particles, it is presumed that the alkyl group derived from the alkylsilane and the cyclic siloxane are more likely to come close to each other and are more easily entangled with each other.

Examples of the method of incorporating the cyclic siloxane into the alkylsilane-treated silica particles include a method of dissolving the alkylsilane in supercritical carbon dioxide in an alkylsilane treatment performed on the silica particles by using supercritical carbon dioxide and then dissolving the cyclic siloxane in the supercritical carbon dioxide after a passage of certain period time.

Surface Treatment Amount of Alkylsilane and Content of Cyclic Siloxane Content of Cyclic Siloxane The content of the cyclic siloxane with respect to the total amount of the alkylsilane-treated silica particles is, for example, preferably 10 ppm or more and 1,000 ppm or less, more preferably 10 ppm or more and 500 ppm or less, and even more preferably 10 ppm or more and 300 ppm or less.

By setting the content of the cyclic siloxane to 10 ppm or more and 1,000 ppm or less with respect to the total amount of the alkylsilane-treated silica particles, the defective cleaning of an image holder in a case where an image having a high image density is formed continuously and at high speed is further suppressed. The reason is presumed as follows.

By setting the content of the cyclic siloxane to 10 ppm or more, it is presumed that the cyclic siloxane is contained to such an extent that the alkyl group derived from the alkylsilane and the cyclic siloxane are sufficiently entangled with each other. By setting to 1,000 ppm or less, it is presumed that the cyclic siloxane is contained to such an extent that, due to the steric hindrance, the cyclic structure of the cyclic siloxane and the alkyl group derived from the alkylsilane are less likely to be entangled with each other, and the cyclic siloxane is not easily released from the alkylsilane-treated silica particles. Therefore, the amount of the cyclic siloxane supplied to the external additive dam is an amount that appropriately improves the strength of the external additive dam.

The content of the cyclic siloxane with respect to the alkylsilane-treated silica particles is calculated by the following procedure. Specifically, a "content of the cyclic siloxane per 10 g of the toner" and a "content of the alkylsilane-treated silica particles per 10 g of the toner" are calculated, and from the calculated values, the "content of the cyclic siloxane with respect to the alkylsilane-treated silica particles" is calculated.

Calculation of Content of Cyclic Siloxane per 10 g of Toner

As a measurement target, 10 g of the toner is added to 100 ml of a 0.5% aqueous solution of a surfactant (for example, preferably sodium alkylbenzene sulfonate), thereby obtaining a toner dispersion. The dispersion is subjected to a dispersion treatment for 5 minutes by using an ultrasonic disperser, and filtered using a filter having an opening size of 0.5 μm to separate the toner particles. The filtrate is dried, the mass of the obtained dried filtrate is measured, 200 mg of the dried filtrate is weighed, and the content of the cyclic siloxane is analyzed with a headspace gas chromatography mass spectrometer (GCMS-QP2020, Shimadzu Corporation). 200 mg of the dried filtrate is put in a vial, and heated to 190° C. with a heating time of 3 minutes. Next, volatile components in the vial are introduced into a column (RTX-1, film thickness: 1 μm, inner diameter: 0.32 mm, length: 60 m) and measured under the following column separation conditions. A peak detection amount for a retention time of 14 minutes is converted into n-hexane and adopted as the content of the cyclic siloxane per 200 mg of the dried filtrate.

Column separation conditions: holding for 5 minutes at an initial temperature of 40° C., heating to 250° C. at a rate of 5° C./min, and holding for 11 minutes at 250° C. Pressure 120 Pa, purge flow rate 30 ml/min. Ion source temperature 260° C., interface temperature 260° C.

The content of the cyclic siloxane per 200 mg of the dried filtrate calculated by the above procedure is converted into a content per total amount of the dried filtrate, and the obtained value is adopted as the content of the cyclic siloxane per 10 g of the toner.

Content of Alkylsilane-Treated Silica Particles per 10 g of Toner

Subsequently, a content of the alkylsilane-treated silica particles per 10 g of the toner is calculated.

The content of the alkylsilane-treated silica particles in the toner is analyzed by a measurement method using fluorescent X-rays described below.

First, as a measurement target, 150 mg of the toner is precisely weighed and subjected to pressure molding for 1 minute in a pressure molding machine at 5 t/cm$^2$, thereby producing a disk-shaped measurement sample having a diameter of 10 mm.

Next, for the produced measurement sample, by using a wavelength dispersive X-ray fluorescence analyzer XRF-1500 (manufactured by Shimadzu Corporation) and an Rh target, a value of Net intensity (kcps) which is an amount of generated X-rays derived from each element is measured under the measurement conditions of a tube voltage of 40 KV, a tube current of 70 mA, and a measurement time of 30 minutes.

On the other hand, toners of 7 levels are produced in advance, which consist of toners of 6 levels obtained by varying the amount of silica particles added (amount of silica particles added: 0.5% by mass, 1% by mass, 2% by mass, 5% by mass, 10% by mass, and 20% by mass (all are amounts of silica particles added with respect to the toner particles)) and a toner without silica particles added, and a calibration curve showing the correlation between the amount of silica particles added and the value of Net intensity of fluorescent X-rays is plotted. Thereafter, based on approximation, the content of the alkylsilane-treated silica particles per 10 g of the toner is calculated from the value of Net intensity (kcps) of the measurement sample.

Calculation of Content of Cyclic Siloxane with Respect to Alkylsilane-Treated Silica Particles By using the "content of the cyclic siloxane per 10 g of the toner" and the "content of the alkylsilane-treated silica particles per 10 g of the toner" calculated by the above procedure, the content of the cyclic siloxane with respect to the alkylsilane-treated silica particles is calculated by the following equation and expressed in ppm.

Content of cyclic siloxane with respect to alkylsilane-treated silica particles=(content of cyclic siloxane per 10 g of toner/content of alkylsilane-treated silica particles per 10 g of toner) Equation:

Ratio (Content of Cyclic Siloxane/Surface Treatment Amount of Alkylsilane)

The ratio of the content of the cyclic siloxane to the surface treatment amount of the alkylsilane (content of cyclic siloxane/surface treatment amount of alkylsilane) is, for example, preferably 0.0001 or more and 0.01 or less, more preferably 0.0003 or more and 0.01 or less, and even more preferably 0.0005 or more and 0.006 or less.

By setting the ratio (content of cyclic siloxane/surface treatment amount of alkylsilane) to 0.0001 or more, it is presumed that the cyclic siloxane is contained to such an extent that the alkyl group derived from the alkylsilane and the cyclic portion of the cyclic siloxane are sufficiently entangled with each other.

By setting the ratio (content of cyclic siloxane/surface treatment amount of alkylsilane) to 0.01 or less, the amount of the cyclic siloxane with respect to the alkyl group derived from the alkylsilane is appropriate. Therefore, it is presumed that the cyclic siloxane is contained to such an extent that the steric hindrance between the cyclic siloxanes is suppressed and the alkyl group derived from the alkylsilane and the cyclic portion of the cyclic siloxane are sufficiently entangled with each other. Accordingly, it is presumed that the amount of the cyclic siloxane supplied to the external additive dam is an amount that appropriately improves the strength of the external additive dam.

From the above, by setting the ratio (content of cyclic siloxane/surface treatment amount of alkylsilane) within the above-described numerical range, the defective cleaning of an image holder in a case where an image having a high image density is formed continuously and at high speed is further suppressed.

The ratio (content of cyclic siloxane/surface treatment amount of alkylsilane) is calculated by dividing the "content of the cyclic siloxane with respect to the alkylsilane-treated silica particles" calculated by the above-described procedure by a "surface treatment amount of the alkylsilane" calculated by the following procedure. Both of the "content of the cyclic siloxane with respect to the alkylsilane-treated silica particles" and the "surface treatment amount of the alkylsilane" are expressed in the unit of "% by mass".

The surface treatment amount of the alkylsilane can be represented as the amount of raw materials used, or can be measured as follows.

In a case where the alkylsilane used for the surface treatment of the alkylsilane-treated silica particles as a measurement target has not been identified, pyrolysis GC-MS (GCMS-QP2020 from Shimadzu Corporation/PY2020D from Frontier Laboratories Ltd.) can be used to identify the alkylsilane used for the surface treatment. The measurement is performed using UltraALLOY-5 (inner diameter: 0.25 mm, film thickness: 0.25 μm, length: 30 m) column under the conditions of an oven temperature of 50° C. and a vaporizing chamber temperature of 310° C., and separation is performed under the conditions of heating to 310° C. at a heating rate of 10° C./min and holding time of 30 minutes. Under the conditions of an ion source temperature of 200° C. and an interface temperature of 310° C., an MS spectrum is obtained after 1.5 minutes of elution to identify the alkylsilane.

As a standard sample, surface-treated silica particles having different surface treatment amounts of alkylsilane are prepared. The standard sample is produced by the following procedure.

Production of Standard Sample

By a sol-gel method adopting the same particle size as the alkylsilane-treated silica particles that are the measurement target, silica particles are prepared. An apparatus equipped with an autoclave with a stirrer (volume: 500 ml) and a back pressure valve is prepared, and the silica particles are put in the autoclave. Thereafter, the autoclave is filled with liquefied carbon dioxide. Thereafter, the stirrer is operated, the autoclave is heated to 170° C. by a heater, and then the pressure is raised to 20 MPa by a carbon dioxide pump. Next, at a point in time when the circulation amount of the supercritical carbon dioxide that has been circulated (integrated value: measured as the circulation amount of carbon dioxide in the standard state) reaches 20 L, the circulation of the supercritical carbon dioxide is stopped, and then the same alkylsilane as the alkylsilane used for the surface treatment of the alkylsilane-treated silica particles that are a measurement target is added.

Thereafter, the temperature is kept at 170° C. by the heater and the pressure is kept at 20 MPa by the carbon dioxide pump such that the supercritical state of the carbon dioxide in the autoclave is maintained. In this state, the stirrer is operated, and the particles are retained for 30 minutes. After the particles are retained for 30 minutes, supercritical carbon dioxide is circulated again, the back pressure valve is opened such that the pressure is reduced to the atmospheric pressure, and the particles are cooled to room temperature. Thereafter, a standard sample is taken out of the autoclave.

By the above procedure, surface-treated silica particles having different surface treatment amounts of alkylsilane are produced as a standard sample. Specifically, as the standard sample, surface-treated silica particles are prepared which have surface treatment amounts of alkylsilane of 0% by mass, 5% by mass, 10% by mass, 20% by mass, 30% by mass, 40% by mass, and 50% by mass (all of the surface treatment amounts of alkylsilane are mass of the alkylsilane used for the surface treatment with respect to the total mass of the surface-treated silica particles).

By using TG-DTA (DTG-60 manufactured by Shimadzu Corporation), the alkylsilane treatment amount of the standard samples is measured, and a calibration curve is plotted. The measurement conditions for TG-DTA are as follows. The temperature is raised to 600° C. under the condition of a heating rate of 10° C./min, and the temperature is held at 600° C. for 10 minutes. A difference between the absolute value of a mass loss occurring in a case where the sample is heated to 600° C. and the absolute value of a mass loss occurring in a case where the sample is heated to 180° C. (that is, "absolute value of mass loss occurring in a case where sample is heated to 600° C.–absolute value of mass loss occurring in a case where sample is heated to 180° C.") is adopted as the alkylsilane treatment amount, and a calibration curve is plotted. This calibration curve is represented by a graph where the ordinate shows the alkylsilane treatment amount (that is, "absolute value of mass loss occurring in a case where sample is heated to 600° C.–absolute value of mass loss occurring in a case where sample is heated to 180° C.") and the abscissa shows the surface treatment amount of the alkylsilane of the standard sample.

As a measurement target, 10 g of the toner is added to 100 ml of a 0.5% aqueous solution of a surfactant (for example, preferably sodium alkylbenzene sulfonate), thereby obtaining a toner dispersion. The dispersion is subjected to a dispersion treatment for 5 minutes by using an ultrasonic disperser, and filtered using a filter having an opening size of 0.5 μm to separate the toner particles. The filtrate is dried to collect the alkylsilane-treated silica particles. The collected alkylsilane-treated silica particles (1 g) are washed with 100 ml of methanol and thoroughly dried. Under the same conditions as the conditions for measuring the standard sample, the alkylsilane treatment amount (that is, "absolute value of mass loss occurring in a case where sample is heated to 600° C.–absolute value of mass loss occurring in a case where sample is heated to 180° C.") is measured, and from the calibration curve, the surface treatment amount of the alkylsilane (that is, the mass of the alkylsilane used for the surface treatment with respect to the total mass of the alkylsilane-treated silica particles, which is expressed in the unit of % by mass) is calculated.

Strontium Titanate Particles

The toner according to the present exemplary embodiment contains, for example, preferably strontium titanate particles.

The average primary particle size of the strontium titanate particles is, for example, preferably 10 nm or more and 100 nm or less, more preferably 20 nm or more and 80 nm or less, even more preferably 20 nm or more and 60 nm or less, and still more preferably 30 nm or more and 60 nm or less.

By setting the average primary particle size of the strontium titanate particles to 10 nm or more and 100 nm or less, the defective cleaning of an image holder in a case where an image having a high image density is formed continuously and at high speed is further suppressed. The reason is presumed as follows.

Since the strontium titanate particles have a small electrostatic repulsive force with the alkylsilane-treated silica particles, the strontium titanate particles are released from the toner particles together with the alkylsilane-treated silica particles, reach the cleaning nip portion, and are included in the external additive dam. In a case where an image having a high image density is formed continuously and at high speed, due to the pressure from the cleaning blade, the alkylsilane-treated silica particles and the strontium titanate particles collide moderately in the external additive dam, thereby forming a densely packed structure. Therefore, the alkylsilane-treated silica particles can be retained in the external additive dam while assisting moderate continuous release of the cyclic siloxane from the alkylsilane-treated silica particles.

By setting the average primary particle size of the strontium titanate particles to 10 nm or more, the strontium titanate particles are easily released from the toner particles and included in the external additive dam, and collision energy in a case of colliding with the silica particles can promote the release of the cyclic siloxane from the alkylsilane-treated silica particles. In addition, by setting the average primary particle size of the strontium titanate particles to 100 nm or less, the collision energy with the silica in the external additive dam is not too strong, and the cyclic siloxane from the alkylsilane-treated silica is released moderately and continuously, without being released at once with a large amount.

A method for measuring the average primary particle size of the strontium titanate particles will be described later.

The average primary particle size of the strontium titanate particles can be controlled, for example, by various conditions adopted in manufacturing the strontium titanate particles by a wet manufacturing method.

From the viewpoint of excellently maintaining transfer properties, for example, the strontium titanate particles are preferably in a roundish shape rather than being in the shape of a cube or rectangle.

The strontium titanate particles are, for example, preferably doped with a metal element other than titanium and strontium (hereinafter, also referred to as a dopant). In a case where the strontium titanate particles contain the dopant, crystallinity of a perovskite structure is reduced, and the strontium titanate particles have a roundish shape.

Specifically, examples of the dopant of the strontium titanate particles include lanthanoid, silica, aluminum, magnesium, calcium, barium, phosphorus, sulfur, vanadium, chromium, manganese, iron, cobalt, nickel, copper, gallium, yttrium, zinc, niobium, molybdenum, ruthenium, rhodium, palladium, silver, indium, tin, antimony, tantalum, tungsten, rhenium, osmium, iridium, platinum, and bismuth. As lanthanoid, for example, lanthanum and cerium are preferable. Among these, from the viewpoint of ease of doping and ease of control of the shape of the strontium titanate particles, for example, lanthanum is preferable.

From the viewpoint of improving the action of the strontium titanate particles, the strontium titanate particles are preferably, for example, strontium titanate particles with surface having undergone a hydrophobic treatment, and more preferably strontium titanate particles with surface having undergone a hydrophobic treatment using a silicon-containing organic compound.

Manufacturing of Strontium Titanate Particles

The wet manufacturing method of the strontium titanate particles is, for example, a manufacturing method of causing a reaction in a state of adding an alkaline aqueous solution to a mixed solution of a titanium oxide source and a strontium source, and then performing an acid treatment. In this manufacturing method, the particle size of the strontium titanate particles is controlled by a mixing proportion of the titanium oxide source and the strontium source, the concentration of the titanium oxide source at the initial state of reaction, the temperature during the addition of the alkaline aqueous solution, the addition rate of the alkaline aqueous solution, and the like.

As the titanium oxide source, for example, a substance which is obtained by deflocculating a titanium compound hydrolysate by a mineral acid is preferable. Examples of the strontium source include strontium nitrate and strontium chloride.

The mixing proportion of the titanium oxide source and the strontium source is, for example, preferably 0.9 or more and 1.4 or less, and more preferably 1.05 or more and 1.20 or less in terms of $SrO/TiO_2$ molar ratio. The concentration of the titanium oxide source, which is $TiO_2$, at the initial state of reaction is, for example, preferably 0.05 mol/L or more and 1.3 mol/L or less, and more preferably 0.5 mol/L or more and 1.0 mol/L or less.

From the viewpoint of allowing the strontium titanate particles to have a roundish shape instead of a cubic or rectangular shape, for example, it is preferable to add a dopant source to the mixed solution of the titanium oxide source and the strontium source. Examples of the dopant source include oxides of metals other than titanium and strontium. The metal oxide as a dopant source is added, for example, as a solution obtained by dissolving the metal oxide in nitric acid, hydrochloric acid, or sulfuric acid. The amount of the dopant source added with respect to 100 mol of strontium contained in the strontium source is, for example, preferably an amount that a metal content in the dopant source is 0.1 mol or more and 20 mol or less, and more preferably an amount that a metal content in the dopant source is 0.5 mol or more and 10 mol or less.

As the alkaline aqueous solution, for example, an aqueous sodium hydroxide solution is preferable. As the temperature of the reaction solution during the addition of the alkaline aqueous solution is higher, strontium titanate particles having better crystallinity are obtained. From the viewpoint of allowing the strontium titanate particles to have the perovskite crystal structure and the roundish shape, the temperature of the reaction solution during the addition of the alkaline aqueous solution is, for example, preferably in a range of 60° C. or higher and 100° C. or lower. In regard to the addition rate of the alkaline aqueous solution, strontium titanate particles with a larger particle size are obtained as the addition rate decreases, and strontium titanate particles with a smaller particle size are obtained as the addition rate increases. The addition rate of the alkaline aqueous solution is, for example, 0.001 equivalents/h or more and 1.2 equivalents/h or less with respect to the prepared raw materials. A proper addition rate of the alkaline aqueous solution is 0.002 equivalents/h or more and 1.1 equivalents/h or less.

After the addition of the alkaline aqueous solution, an acid treatment is performed for the purpose of removing the unreacted strontium source. In the acid treatment, for example, by using hydrochloric acid, the pH of the reaction solution is adjusted to 2.5 to 7.0, preferably to 4.5 to 6.0. After the acid treatment, the reaction solution is solid-liquid separated, and the solid content is subjected to a drying treatment, thereby obtaining strontium titanate particles.

Surface Treatment

The surface treatment for the strontium titanate particles is performed, for example, by preparing a treatment liquid obtained by mixing a silicon-containing organic compound as a hydrophobic agent with a solvent, mixing the treatment liquid with the strontium titanate particles under stirring, and continuing stirring. After the surface treatment, for the purpose of removing the solvent in the treatment liquid, a drying treatment is performed.

Examples of the silicon-containing organic compound used in the surface treatment for the strontium titanate particles include alkylsilane, a silazane compound, and a silicone oil.

As the alkylsilane used in the surface treatment for the strontium titanate particles, the same compound as the alkylsilane used in the surface treatment for the silica particles described above can be adopted.

Examples of the silazane compound used in the surface treatment for the strontium titanate particles include dimethyldisilazane, trimethyldisilazane, tetramethyldisilazane, pentamethyldisilazane, and hexamethyldisilazane.

Examples of the silicone oil used in the surface treatment for the strontium titanate particles include silicone oils such as dimethylpolysiloxane, diphenylpolysiloxane, and phenylmethylpolysiloxane; and reactive silicone oils such as amino-modified polysiloxane, epoxy-modified polysiloxane, carboxyl-modified polysiloxane, carbinol-modified polysiloxane, fluorine-modified polysiloxane, methacryl-modified polysiloxane, mercapto-modified polysiloxane, and phenol-modified polysiloxane.

The solvent used for preparing the above-described treatment liquid is, for example, preferably an alcohol (for example, methanol, ethanol, propanol, or butanol) in a case where the silicon-containing organic compound is alkylsilane, or preferably hydrocarbons (for example, benzene, toluene, normal hexane, and normal heptane) in a case where the silicon-containing organic compound is a silicone oil.

In the above-described treatment liquid, the concentration of the silicon-containing organic compound is, for example, preferably 1% by mass or more and 50% by mass or less, more preferably 5% by mass or more and 40% by mass or less, and even more preferably 10% by mass or more and 30% by mass or less.

The amount of the silicon-containing organic compound used in the surface treatment is, for example, preferably 1 part by mass or more and 50 parts by mass or less, more preferably 5 parts by mass or more and 40 parts by mass or less, and even more preferably 5 parts by mass or more and 30 parts by mass or less with respect to 100 parts by mass of the strontium titanate particles.

Average Primary Particle Size of Strontium Titanate Particles/Average Primary Particle Size of Alkylsilane-Treated Silica Particles In a case where the toner according to the present exemplary embodiment contains strontium titanate particles, the average primary particle size of the strontium titanate particles with respect to the average primary particle size of the alkylsilane-treated silica particles (average primary particle size of strontium titanate particles/average primary particle size of alkylsilane-treated silica particles) is, for example, preferably 0.01 or more and 2.0 or less, more preferably 0.07 or more and 1.8 or less, and even more preferably 0.1 or more and 1.5 or less.

By setting the average primary particle size of the strontium titanate particles with respect to the average primary particle size of the alkylsilane-treated silica particles to 0.01 or more and 2.0 or less, the defective cleaning of an image holder in a case where an image having a high image density is formed continuously and at high speed is further suppressed. The reason is presumed as follows.

By setting the average primary particle size of the strontium titanate particles with respect to the average primary particle size of the alkylsilane-treated silica particles to 0.01 or more, in the collision with the silica in the external additive dam, enough collision energy is obtained to moderately promote the release of the cyclic siloxane from the alkylsilane-treated silica. In addition, by setting the average primary particle size of the strontium titanate particles with respect to the average primary particle size of the alkylsilane-treated silica particles to 2.0 or less, collision with the silica in the external additive dam meet the collision frequency energy required to moderately release the cyclic siloxane from the alkylsilane-treated silica.

Measuring Method of Average Primary Particle Size

The method for measuring the average primary particle size of the alkylsilane-treated silica particles and the average primary particle size of the strontium titanate particles will be described below.

Method for Measuring Average Primary Particle Size of Alkylsilane-Treated Silica Particles Using a scanning electron microscope (SEM) (manufactured by Hitachi High-Tech Corporation, S-4800) equipped with an energy dispersive X-ray analyzer (EDX device) (manufactured by HORIBA, Ltd., EMAX Evolution X-Max 80 $mm^2$), an image of a toner containing the alkylsilane-treated silica particles is captured at a magnification of 40,000. By EDX analysis, 300 or more primary silica particles are identified from one field of view based on the presence of Si. The SEM observation is performed at an acceleration voltage of 15 kV, an emission current of 20 μA, and WD of 15 mm, and the EDX analysis is performed under the same conditions for a detection time of 60 minutes.

By the analysis of identified silica particles with the image processing/analysis software WinRoof (MITANI CORPORATION), the equivalent circular diameter, area, and perimeter of each of primary particle images are determined, and circularity$=4\pi\times(\text{area})\pm(\text{perimeter})^2$ is calculated. In the distribution of equivalent circular diameter, the equivalent circular diameter below which the cumulative percentage of particles having smaller equivalent circular diameter reaches 50% is defined as an average primary particle size.

Method for Measuring Average Primary Particle Size of Strontium Titanate Particles In the present exemplary embodiment, the primary particle size of the strontium titanate particles is a diameter of a circle having the same area as a primary particle image of the strontium titanate particles (so-called equivalent circular diameter), and the average primary particle size of the strontium titanate particles is a particle size that is cumulatively 50% from a small size side in the number-based distribution of the primary particle sizes of the strontium titanate particles. The average primary particle size of the strontium titanate particles is obtained by performing image analysis of at least 300 strontium titanate particles B.

Using a scanning electron microscope (SEM) (manufactured by Hitachi High-Tech Corporation, S-4800) equipped with an energy dispersive X-ray analyzer (EDX device) (manufactured by HORIBA, Ltd., EMAX Evolution X-Max 80 $mm^2$), an image of a toner containing the strontium titanate particles is captured at a magnification of 40,000. By EDX analysis, 300 or more primary strontium titanate particles are identified based on the presence of Sr. The SEM observation is performed at an acceleration voltage of 15 kV, an emission current of 20 μA, and WD of 15 mm, and the EDX analysis is performed under the same conditions for a detection time of 60 minutes.

By the analysis of identified strontium titanate particles with the image processing/analysis software WinRoof (MITANI CORPORATION), the equivalent circular diameter, area, and perimeter of each of primary particle images are determined, and circularity=$4\pi \times (\text{area}) \pm (\text{perimeter})^2$ is calculated. In the distribution of equivalent circular diameter, the equivalent circular diameter below which the cumulative percentage of particles having smaller equivalent circular diameter reaches 50% is defined as an average primary particle size.

Content Ratio of Alkylsilane-Treated Silica Particles and Strontium Titanate Particles The content of the strontium titanate particles with respect to the content of the silica particles (content of strontium titanate particles/content of silica particles) is, for example, preferably 0.01 or more and 1.0 or less, more preferably 0.02 or more and 0.9 or less, and even more preferably 0.03 or more and 0.8 or less.

By setting the content of the strontium titanate particles with respect to the content of the silica particles to 0.01 or more and 1.0 or less, the defective cleaning of an image holder in a case where an image having a high image density is formed continuously and at high speed is further suppressed. The reason is presumed as follows.

By setting the content of the strontium titanate particles with respect to the content of the silica particles to 0.01 or more, the content of the strontium titanate particles contained in the external additive dam is appropriately increased, and collision with the silica in the external additive dam meet the collision frequency required to moderately release the cyclic siloxane from the alkylsilane-treated silica, so that it is considered that the effect of assisting moderate and continuous release of the cyclic siloxane is improved.

By setting the content of the strontium titanate particles with respect to the content of the silica particles to 1.0 or less, the content of the strontium titanate particles contained in the external additive dam is appropriate, and collision with the silica in the external additive dam meet the collision frequency required to moderately release the cyclic siloxane from the alkylsilane-treated silica, so that it is considered that the effect of assisting moderate and continuous release of the cyclic siloxane is improved. As a result, the collision frequency with the silica in the external additive dam is not excessive, and the cyclic siloxane can be released moderately and continuously from the alkylsilane-treated silica, without being released at once with a large amount.

Toner Particles

The toner particles include, for example, a binder resin and, as necessary, a colorant, a release agent, and other additives.

Binder Resin

Examples of the binder resin include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these binder resins may be used alone, or two or more kinds of these binder resins may be used in combination.

As the binder resin, for example, a polyester resin is preferable.

Examples of the polyester resin include known polyester resins.

Examples of the polyester resin include a polycondensate of a polyvalent carboxylic acid and a polyhydric alcohol. As the polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of these, lower alkyl esters (for example, having 1 or more and 5 or less carbon atoms) of these, and the like.

One kind of polyvalent carboxylic acid may be used alone, or two or more kinds of polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among these, for example, aromatic diols and alicyclic diols are preferable as the polyhydric alcohol, and aromatic diols are more preferable.

As the polyhydric alcohol, a polyhydric alcohol having three or more hydroxyl groups and a crosslinked structure or a branched structure may be used in combination with a diol. Examples of the polyhydric alcohol having three or more hydroxyl groups include glycerin, trimethylolpropane, and pentaerythritol.

One kind of polyhydric alcohol may be used alone, or two or more kinds of polyhydric alcohols may be used in combination.

The glass transition temperature (Tg) of the polyester resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K 7121-1987, "Testing methods for transition temperatures of plastics".

The weight-average molecular weight (Mw) of the polyester resin is, for example, preferably 5,000 or more and 1,000,000 or less, and more preferably 7,000 or more and 500,000 or less.

The number-average molecular weight (Mn) of the polyester resin is, for example, preferably 2,000 or more and 100,000 or less.

The molecular weight distribution Mw/Mn of the polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC•HLC-8120GPC manufactured by Tosoh Corporation as a measurement device, TSKgel Super HM-M (15 cm) manufactured by Tosoh Corporation as a column, and THF as a solvent. The weight-average molecular weight and the number-average molecular weight are calculated using a molecular weight calibration curve plotted using a monodisperse polystyrene standard sample from the measurement results.

The polyester resin is obtained by a well-known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is distilled off. In a case where a monomer with poor compatibility takes part in the reaction, for example, the monomer with poor compatibility may be condensed in advance with an acid or an alcohol that is to be polycondensed with the monomer, and then polycondensed with the main component.

The content of the binder resin with respect to the total amount of the toner particles is, for example, preferably 40% by mass or more and 95% by mass or less, more preferably 50% by mass or more and 90% by mass or less, and even more preferably 60% by mass or more and 85% by mass or less.

Colorant

Examples of the colorant include various pigments such as carbon black, chrome yellow, Hansa yellow, benzidine yellow, threne yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and various dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye.

One kind of colorant may be used alone, or two or more kinds of colorants may be used in combination.

As the colorant, a colorant having undergone a surface treatment as necessary may be used, or a dispersant may be used in combination with the colorant. Furthermore, a plurality of kinds of colorants may be used in combination.

The content of the colorant with respect to the total mass of the toner particles is, for example, preferably 1% by mass or more and 30% by mass or less, and more preferably 3% by mass or more and 15% by mass or less.

Release Agent

Examples of the release agent include hydrocarbon-based wax; natural wax such as carnauba wax, rice wax, and candelilla wax; synthetic or mineral•petroleum-based wax such as montan wax; ester-based wax such as fatty acid esters and montanic acid esters; and the like. The release agent is not limited to these.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The content of the release agent with respect to the total amount of the toner particles is, for example, preferably 1% by mass or more and 20% by mass or less, and more preferably 5% by mass or more and 15% by mass or less.

Other Additives

Examples of other additives include well-known additives such as a magnetic material, a charge control agent, and inorganic powder. These additives are incorporated into the toner particles as internal additives.

Characteristics of Toner Particles and the Like

The toner particles may be toner particles that have a single-layer structure or toner particles having a so-called core/shell structure that is configured with a core portion (core particle) and a coating layer (shell layer) covering the core portion.

The toner particles having a core/shell structure may, for example, be configured with a core portion that is configured with a binder resin and other additives used as necessary, such as a colorant and a release agent, and a coating layer that is configured with a binder resin.

The volume-average particle size (D50v) of the toner particles is, for example, preferably 2 μm or more and 10 μm or less, and more preferably 4 μm or more and 8 μm or less.

The various average particle sizes and various particle size distribution indexes of the toner particles are measured using COULTER MULTISIZER II (manufactured by Beckman Coulter, Inc.) and using ISOTON-II (manufactured by Beckman Coulter, Inc.) as an electrolytic solution.

For measurement, a measurement sample in an amount of 0.5 mg or more and 50 mg or less is added to 2 ml of a 5% aqueous solution of a surfactant (preferably sodium alkylbenzene sulfonate, for example) as a dispersant. The obtained solution is added to an electrolytic solution in a volume of 100 ml or more and 150 ml or less.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

For the particle size range (channel) divided based on the measured particle size distribution, a cumulative volume distribution and a cumulative number distribution are plotted from small-sized particles. The particle size at which the cumulative percentage of particles is 16% is defined as volume-based particle size D16v and a number-based particle size D16p. The particle size at which the cumulative percentage of particles is 50% is defined as volume-average particle size D50v and a cumulative number-average particle size D50p. The particle size at which the cumulative percentage of particles is 84% is defined as volume-based particle size D84v and a number-based particle size D84p.

By using these, a volume-average particle size distribution index (GSDv) is calculated as $(D84v/D16v)^{1/2}$, and a number-average particle size distribution index (GSDp) is calculated as $(D84p/D16p)^{1/2}$.

The average circularity of the toner particles is, for example, preferably 0.94 or more and 1.00 or less, and more preferably 0.95 or more and 0.98 or less.

The average circularity of the toner particles is determined by (equivalent circular perimeter)/(perimeter) [(perimeter of circle having the same projected area as particle image)/(perimeter of projected particle image)]. Specifically, the average circularity is a value measured by the following method.

First, toner particles as a measurement target are collected by suction, and a flat flow of the particles is formed. Thereafter, an instant flash of strobe light is emitted to the particles, and the particles are imaged as a still image. By using a flow-type particle image analyzer (FPIA-3000 manufactured by Sysmex Corporation) performing image analysis on the particle image, the average circularity is determined. The number of samplings for determining the average circularity is 3,500.

In a case where a toner contains external additives, the toner (developer) as a measurement target is dispersed in water containing a surfactant, then the dispersion is treated with ultrasonic waves such that the external additives are removed, and the toner particles are collected.

External Additive

The toner according to the present exemplary embodiment may contain inorganic particles other than the alkylsilane-treated silica particles and the strontium titanate particles, as an external additive.

Examples of the inorganic particles include $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO·SiO_2$, $K_2O·(TiO_2)_n$, $Al_2O_3·2SiO_2$, $CaCO_3$, $MgCO_3$, $BaSO_4$, and $MgSO_4$.

The surface of the inorganic particles as an external additive may have undergone, for example, a hydrophobic treatment. The hydrophobic treatment is performed, for example, by immersing the inorganic particles in a hydrophobic agent. The hydrophobic agent is not particularly limited, and examples thereof include a silane-based coupling agent, silicone oil, a titanate-based coupling agent, and an aluminum-based coupling agent. One kind of each of these agents may be used alone, or two or more kinds of these agents may be used in combination.

Usually, the amount of the hydrophobic agent is, for example, 1 part by mass or more and 10 parts by mass or less with respect to 100 parts by mass of the inorganic particles.

Examples of external additives also include resin particles (resin particles such as polystyrene, polymethylmethacrylate (PMMA), and melamine resins), a cleaning activator (for example, a metal salt of a higher fatty acid represented by zinc stearate or fluorine-based polymer particles), and the like.

The amount of the external additives used in combination with the alkylsilane-treated silica particles with respect to the toner particles is, for example, preferably 0% by mass or more and 5% by mass or less, and more preferably 0% by mass or more and 3% by mass or less.

Manufacturing Method of Toner

Next, the manufacturing method of the toner according to the present exemplary embodiment will be described.

The toner according to the present exemplary embodiment is obtained by manufacturing toner particles and then externally adding the alkylsilane-treated silica particles and the strontium titanate particles as necessary to the toner particles.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). The manufacturing method of the toner particles is not particularly limited to these manufacturing methods, and a well-known manufacturing method is adopted.

Among the above methods, for example, the aggregation and coalescence method may be used for obtaining toner particles.

Specifically, for example, in a case where the toner particles are manufactured by the aggregation and coalescence method, the toner particles are manufactured through a step of preparing a resin particle dispersion in which resin particles to be a binder resin are dispersed (a resin particle dispersion-preparing step), a step of allowing the resin particles (plus other particles as necessary) to be aggregated in the resin particle dispersion (having been mixed with another particle dispersion as necessary) so as to form aggregated particles (aggregated particle-forming step), and a step of heating an aggregated particle dispersion in which the aggregated particles are dispersed to allow the aggregated particles to undergo coalescence and to form toner particles (coalescence step).

Hereinafter, each of the steps will be specifically described.

In the following section, a method for obtaining toner particles containing a colorant and a release agent will be described. The colorant and the release agent are used as necessary. Naturally, other additives different from the colorant and the release agent may also be used.

Resin Particle Dispersion-Preparing Step

First, for example, a colorant particle dispersion in which colorant particles are dispersed and a release agent particle dispersion in which release agent particles are dispersed are prepared together with the resin particle dispersion in which resin particles to be a binder resin are dispersed.

The resin particle dispersion is prepared, for example, by dispersing the resin particles in a dispersion medium by using a surfactant.

Examples of the dispersion medium used for the resin particle dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, an anionic surfactant and a cationic surfactant are particularly mentioned. The nonionic surfactant may be used in combination with an anionic surfactant or a cationic surfactant.

One kind of surfactant may be used alone, or two or more kinds of surfactants may be used in combination.

As for the resin particle dispersion, examples of the method for dispersing resin particles in the dispersion medium include general dispersion methods such as a rotary shearing homogenizer, a ball mill having media, a sand mill, and a dyno mill. Depending on the type of resin particles, the resin particles may be dispersed in the resin particle dispersion by using, for example, a transitional phase inversion emulsification method.

The transitional phase inversion emulsification method is a method of dissolving a resin to be dispersed in a hydrophobic organic solvent in which the resin is soluble, adding a base to an organic continuous phase (O phase) for causing neutralization, and then adding an aqueous medium (W phase), such that the resin undergoes conversion (so-called phase transition) from W/O to O/W, turns into a discontinuous phase, and is dispersed in the aqueous medium in the form of particles.

The volume-average particle size of the resin particles dispersed in the resin particle dispersion is, for example, preferably 0.01 μm or more and 1 μm or less, more preferably 0.08 μm or more and 0.8 μm or less, and even more preferably 0.1 μm or more and 0.6 μm or less.

For determining the volume-average particle size of the resin particles, a particle size distribution is measured using a laser diffraction-type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

For example, a colorant particle dispersion and a release agent particle dispersion are prepared in the same manner as that adopted for preparing the resin particle dispersion. That is, the volume-average particle size of particles, the dispersion medium, the dispersion method, and the particle content in the resin particle dispersion are also applied to the colorant particles to be dispersed in the colorant particle dispersion and the release agent particles to be dispersed in the release agent particle dispersion.

Aggregated Particle-Forming Step

Next, the resin particle dispersion is mixed with the colorant particle dispersion and the release agent particle dispersion.

Thereafter, in the mixed dispersion, the resin particles, the colorant particles, and the release agent particles are hetero-aggregated such that aggregated particles are formed which have a diameter close to the diameter of the target toner particles and include the resin particles, the colorant particles, and the release agent particles.

Specifically, for example, an aggregating agent is added to the mixed dispersion, the pH of the mixed dispersion is adjusted such that the dispersion is acidic (for example, pH of 2 or higher and 5 or lower), and a dispersion stabilizer is added thereto as necessary. Thereafter, the dispersion is heated to the glass transition temperature of the resin particles (specifically, for example, to a temperature equal to or higher than the glass transition temperature of the resin particles−30° C. and equal to or lower than the glass transition temperature of the resin particles−10° C.) such that the particles dispersed in the mixed dispersion are aggregated, thereby forming aggregated particles.

In the aggregated particle-forming step, for example, in a state where the mixed dispersion is stirred with a rotary shearing homogenizer, the aggregating agent may be added thereto at room temperature (for example, 25° C.), the pH of the mixed dispersion may be adjusted such that the dispersion is acidic (for example, pH of 2 or higher and 5 or lower), a dispersion stabilizer may be added to the dispersion as necessary, and then the dispersion may be heated.

Examples of the aggregating agent include a surfactant having polarity opposite to the polarity of the surfactant used as a dispersant added to the mixed dispersion, an inorganic metal salt, and a metal complex having a valency of 2 or higher. Particularly, in a case where a metal complex is used as the aggregating agent, the amount of the surfactant used is reduced, and the charging characteristics are improved.

An additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Coalescence Step

The aggregated particle dispersion in which the aggregated particles are dispersed is then heated to, for example, a temperature equal to or higher than the glass transition temperature of the resin particles (for example, a temperature higher than the glass transition temperature of the resin particles by 10° C. to 30° C.) such that the aggregated particles coalesce, thereby forming toner particles.

Toner particles are obtained through the above steps.

The toner particles may be manufactured through a step of obtaining an aggregated particle dispersion in which the aggregated particles are dispersed, then mixing the aggregated particle dispersion with a resin particle dispersion in which resin particles are dispersed to cause the resin particles to be aggregated and adhere to the surface of the aggregated particles and to form second aggregated particles, and a step of heating a second aggregated particle dispersion in which the second aggregated particles are dispersed to cause the second aggregated particles to coalesce and to form toner particles having a core/shell structure.

After the coalescence step, the toner particles formed in a solution undergo a known washing step, solid-liquid separation step, and drying step, thereby obtaining dry toner particles.

The washing step is not particularly limited. However, in view of charging properties, displacement washing may be thoroughly performed using deionized water. The solid-liquid separation step is not particularly limited. However, in view of productivity, suction filtration, pressure filtration, or the like may be performed. Furthermore, the method of the drying step is not particularly limited. However, in view of productivity, freeze drying, flush drying, fluidized drying, vibratory fluidized drying, or the like may be performed.

For example, by adding the alkylsilane-treated silica particles and the strontium titanate particles as necessary to the obtained dry toner particles and mixing these particles together, the toner according to the present exemplary embodiment is manufactured. The mixing may be performed, for example, using a V blender, a Henschel mixer, a Lodige mixer, or the like. Furthermore, coarse particles of the toner may be removed as necessary by using a vibratory sieving machine, a pneumatic sieving machine, or the like.

Electrostatic Charge Image Developer

The electrostatic charge image developer according to the present exemplary embodiment contains at least the toner according to the present exemplary embodiment.

The electrostatic charge image developer according to the present exemplary embodiment may be a one-component developer which contains only the toner according to the present exemplary embodiment or a two-component developer which is obtained by mixing the toner and a carrier together.

The carrier is not particularly limited, and examples thereof include known carriers. Examples of the carrier include a coated carrier obtained by coating the surface of a core material consisting of magnetic powder with a coating resin; a magnetic powder dispersion-type carrier obtained by dispersing magnetic powder in a matrix resin and mixing the powder and the resin together; and a resin impregnation-type carrier obtained by impregnating porous magnetic powder with a resin.

Each of the magnetic powder dispersion-type carrier and the resin impregnation-type carrier may be a carrier obtained by coating a core material, which is particles configuring the carrier, with a coating resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like.

The coating resin and the matrix resin may contain other additives such as conductive particles.

Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a coating resin, for example, by a coating method using a solution for forming a coating layer obtained by dissolving the coating resin and various additives, which are used as necessary, in an appropriate solvent, and the like. The solvent is not particularly limited, and may be selected in consideration of the type of the coating resin used, coating suitability, and the like.

Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; and a kneader coater method of mixing the core material of the carrier with the solution for forming a coating layer in a kneader coater and removing solvents.

The mixing ratio (mass ratio) between the toner and the carrier, represented by toner:carrier, in the two-component developer is, for example, preferably 1:100 to 30:100, and more preferably 3:100 to 20:100.

Image Forming Apparatus/Image Forming Method

The image forming apparatus/image forming method according to the present exemplary embodiment will be described.

The image forming apparatus according to the present exemplary embodiment includes an image holder, a charging unit that charges the surface of the image holder, an electrostatic charge image forming unit that forms an electrostatic charge image on the charged surface of the image holder, a developing unit that contains an electrostatic charge image developer and develops the electrostatic charge image formed on the surface of the image holder as a toner image by using the electrostatic charge image developer, a transfer unit that transfers the toner image formed on the surface of the image holder to the surface of a recording medium, and a fixing unit that fixes the toner image transferred to the surface of the recording medium. As the electrostatic charge image developer, the electrostatic charge image developer according to the present exemplary embodiment is used.

In the image forming apparatus according to the present exemplary embodiment, an image forming method (image forming method according to the present exemplary embodiment) is performed which has a charging step of charging the surface of the image holder, an electrostatic charge image forming step of forming an electrostatic charge image on the charged surface of the image holder, a developing step of developing the electrostatic charge image formed on the surface of the image holder as a toner image by using the electrostatic charge image developer according to the present exemplary embodiment, a transfer step of transferring the toner image formed on the surface of the image holder to the surface of a recording medium, and a fixing step of fixing the toner image transferred to the surface of the recording medium.

As the image forming apparatus according to the present exemplary embodiment, well-known image forming apparatuses are used, such as a direct transfer-type apparatus that transfers a toner image formed on the surface of the image holder directly to a recording medium; an intermediate transfer-type apparatus that performs primary transfer by which the toner image formed on the surface of the image holder is transferred to the surface of an intermediate transfer member and secondary transfer by which the toner image transferred to the surface of the intermediate transfer member is transferred to the surface of a recording medium; an apparatus including a cleaning unit that cleans the surface of the image holder before charging after the transfer of the toner image; and an apparatus including a charge neutralizing unit that neutralizes charge by irradiating the surface of the image holder with charge neutralizing light before charging after the transfer of the toner image.

In the case of the intermediate transfer-type apparatus, as the transfer unit, for example, a configuration is adopted which has an intermediate transfer member with surface on which the toner image will be transferred, a primary transfer unit that performs primary transfer to transfer the toner image formed on the surface of the image holder to the surface of the intermediate transfer member, and a secondary transfer unit that performs secondary transfer to transfer the toner image transferred to the surface of the intermediate transfer member to the surface of a recording medium.

In the image forming apparatus according to the present exemplary embodiment, for example, a portion including the developing unit may be a cartridge structure (process cartridge) to be attached to and detachable from the image forming apparatus. As the process cartridge, for example, a process cartridge is suitably used which includes a developing unit that contains the electrostatic charge image developer according to the present exemplary embodiment.

An example of the image forming apparatus according to the present exemplary embodiment will be shown below, but the present invention is not limited thereto. Hereinafter, among the parts shown in the drawing, main parts will be described, and others will not be described.

FIG. 1 is a view schematically showing the configuration of the image forming apparatus according to the present exemplary embodiment.

The image forming apparatus shown in FIG. 1 includes first to fourth image forming units 10Y, 10M, 10C, and 10K (image forming means) adopting an electrophotographic method that output images of colors, yellow (Y), magenta (M), cyan (C), and black (K), based on color-separated image data. These image forming units (hereinafter, simply called "units" in some cases) 10Y, 10M, 10C, and 10K are arranged in a row in the horizontal direction in a state of being spaced apart by a predetermined distance. The units 10Y, 10M, 10C, and 10K may be process cartridges that are attached to and detachable from the image forming apparatus.

An intermediate transfer belt 20 as an intermediate transfer member passing through the units 10Y, 10M, 10C, and 10K extends above the units in the drawing. The intermediate transfer belt 20 is looped over a driving roll 22 and a support roll 24 which is in contact with the inner surface of the intermediate transfer belt 20, the rolls 22 and 24 being spaced apart in the horizontal direction in the drawing. The intermediate transfer belt 20 is designed to run in a direction toward the fourth unit 10K from the first unit 10Y. Force is applied to the support roll 24 in a direction away from the driving roll 22 by a spring or the like (not shown in the drawing). Tension is applied to the intermediate transfer belt 20 looped over the two rolls. An intermediate transfer member cleaning device 30 facing the driving roll 22 is provided on the surface of the intermediate transfer belt 20 on the image holder side.

Toners including toners of four colors, yellow, magenta, cyan, and black, stored in containers of toner cartridges 8Y, 8M, 8C, and 8K are supplied to developing devices (developing units) 4Y, 4M, 4C, and 4K of units 10Y, 10M, 10C, and 10K, respectively.

The first to fourth units 10Y, 10M, 10C, and 10K have the same configuration. Therefore, in the present specification, as a representative, the first unit 10Y will be described which is placed on the upstream side of the running direction of the intermediate transfer belt and forms a yellow image. Reference numerals marked with magenta (M), cyan (C), and black (K) instead of yellow (Y) are assigned in the same portions as in the first unit 10Y, such that the second to fourth units 10M, 10C, and 10K will not be described again.

The first unit 10Y has a photoreceptor 1Y that acts as an image holder. Around the photoreceptor 1Y, a charging roll (an example of the charging unit) 2Y that charges the surface of the photoreceptor 1Y at a predetermined potential, an exposure device (an example of the electrostatic charge image forming unit) 3 that exposes the charged surface to a laser beam 3Y based on color-separated image signals to form an electrostatic charge image, a developing device (an example of the developing unit) 4Y that develops the electrostatic charge image by supplying a charged toner to the electrostatic charge image, a primary transfer roll (an example of the primary transfer unit) 5Y that transfers the developed toner image onto the intermediate transfer belt 20, and a photoreceptor cleaning device (an example of the cleaning unit) 6Y that removes the residual toner on the surface of the photoreceptor 1Y after the primary transfer are arranged in this order.

The primary transfer roll 5Y is disposed on the inner side of the intermediate transfer belt 20, at a position facing the photoreceptor 1Y. Furthermore, a bias power supply (not shown in the drawing) for applying a primary transfer bias is connected to each of primary transfer rolls 5Y, 5M, 5C, and 5K. Each bias power supply varies the transfer bias applied to each primary transfer roll under the control of a control unit not shown in the drawing.

Hereinafter, the operation that the first unit 10Y carries out to form a yellow image will be described.

First, prior to the operation, the surface of the photoreceptor 1Y is charged to a potential of −600 V to −800 V by the charging roll 2Y.

The photoreceptor 1Y is formed of a photosensitive layer laminated on a conductive (for example, volume resistivity at 20° C.: $1\times10^{-6}$ Ωcm or less) substrate. The photosensitive layer has properties in that although this layer usually has a high resistance (resistance of a general resin), in a case where the photosensitive layer is irradiated with the laser beam 3Y, the specific resistance of the portion irradiated with the laser beam changes. Therefore, through an exposure device 3, the laser beam 3Y is output to the surface of the charged photoreceptor 1Y according to the image data for yellow transmitted from the control unit not shown in the drawing. The laser beam 3Y is radiated to the photosensitive layer on the surface of the photoreceptor 1Y. As a result, an electrostatic charge image of a yellow image pattern is formed on the surface of the photoreceptor 1Y.

The electrostatic charge image is an image formed on the surface of the photoreceptor 1Y by charging. This image is a so-called negative latent image formed in a manner in which the charges with which the surface of the photoreceptor 1Y is charged flow due to the reduction in the specific resistance of the portion of the photosensitive layer irradiated with the laser beam 3Y, but the charges in a portion not being irradiated with the laser beam 3Y remain.

The electrostatic charge image formed on the photoreceptor 1Y is rotated to a predetermined development position as the photoreceptor 1Y runs. At the development position, the electrostatic charge image on the photoreceptor 1Y turns into a visible image (developed image) as a toner image by the developing device 4Y.

The developing device 4Y contains, for example, an electrostatic charge image developer that contains at least a yellow toner and a carrier. By being agitated in the developing device 4Y, the yellow toner undergoes triboelectrification, carries charges of the same polarity (negative polarity) as the charges with which the surface of the photoreceptor 1Y is charged, and is held on a developer roll (an example of a developer holder). As the surface of the photoreceptor 1Y passes through the developing device 4Y, the yellow toner electrostatically adheres to the neutralized latent image portion on the surface of the photoreceptor 1Y, and the latent image is developed by the yellow toner. The photoreceptor 1Y on which the yellow toner image is formed keeps on running at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and electrostatic force heading for the primary transfer roll 5Y from the photoreceptor 1Y acts on the toner image. As a result, the toner image on the photoreceptor 1Y is transferred onto the intermediate transfer belt 20. The transfer bias applied at this time has a polarity (+) opposite to the polarity (−) of the toner. For example, in the first unit 10Y, the transfer bias is set to +10 μA under the control of the control unit (not shown in the drawing).

Meanwhile, the residual toner on the photoreceptor 1Y is removed by a photoreceptor cleaning device 6Y and collected.

Furthermore, the primary transfer bias applied to the primary transfer rolls 5M, 5C, and 5K following the second unit 10M is also controlled according to the first unit.

In this way, the intermediate transfer belt 20 to which the yellow toner image is transferred in the first unit 10Y is sequentially transported through the second to fourth units 10M, 10C, and 10K, and the toner images of each color are superposed and transferred in layers.

The intermediate transfer belt 20, to which the toner images of four colors are transferred in layers through the first to fourth units, reaches a secondary transfer portion configured with the intermediate transfer belt 20, the support roll 24 in contact with the inner surface of the intermediate transfer belt, and a secondary transfer roll 26 (an example of secondary transfer unit) disposed on the image holding surface side of the intermediate transfer belt 20. On the other hand, through a supply mechanism, recording paper P (an example of recording medium) is supplied at a predetermined timing to the gap between the secondary transfer roll 26 and the intermediate transfer belt 20 that are in contact with each other. Furthermore, secondary transfer bias is applied to the support roll 24. The transfer bias applied at this time has the same polarity (−) as the polarity (−) of the toner. The electrostatic force heading for the recording paper P from the intermediate transfer belt 20 acts on the toner image, which makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

Thereafter, the recording paper P is transported into a pressure contact portion (nip portion) of a pair of fixing rolls in the fixing device 28 (an example of fixing unit), the toner image is fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet, in addition to the recording paper P.

In order to further improve the smoothness of the image surface after fixing, for example, it is preferable that the surface of the recording paper P is also smooth. For example, coated paper prepared by coating the surface of plain paper with a resin or the like, art paper for printing, and the like are suitably used.

The recording paper P on which the color image has been fixed is transported to an output portion, and a series of color image forming operations is finished.

Process Cartridge/Toner Cartridge

The process cartridge according to the present exemplary embodiment will be described.

The process cartridge according to the present exemplary embodiment includes a developing unit which contains the electrostatic charge image developer according to the present exemplary embodiment and develops an electrostatic charge image formed on the surface of an image holder as a toner image by using the electrostatic charge image developer. The process cartridge is detachable from the image forming apparatus.

The process cartridge according to the present exemplary embodiment is not limited to the above configuration. The process cartridge may be configured with a developing device and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawing, main parts will be described, and others will not be described.

Figure 2:
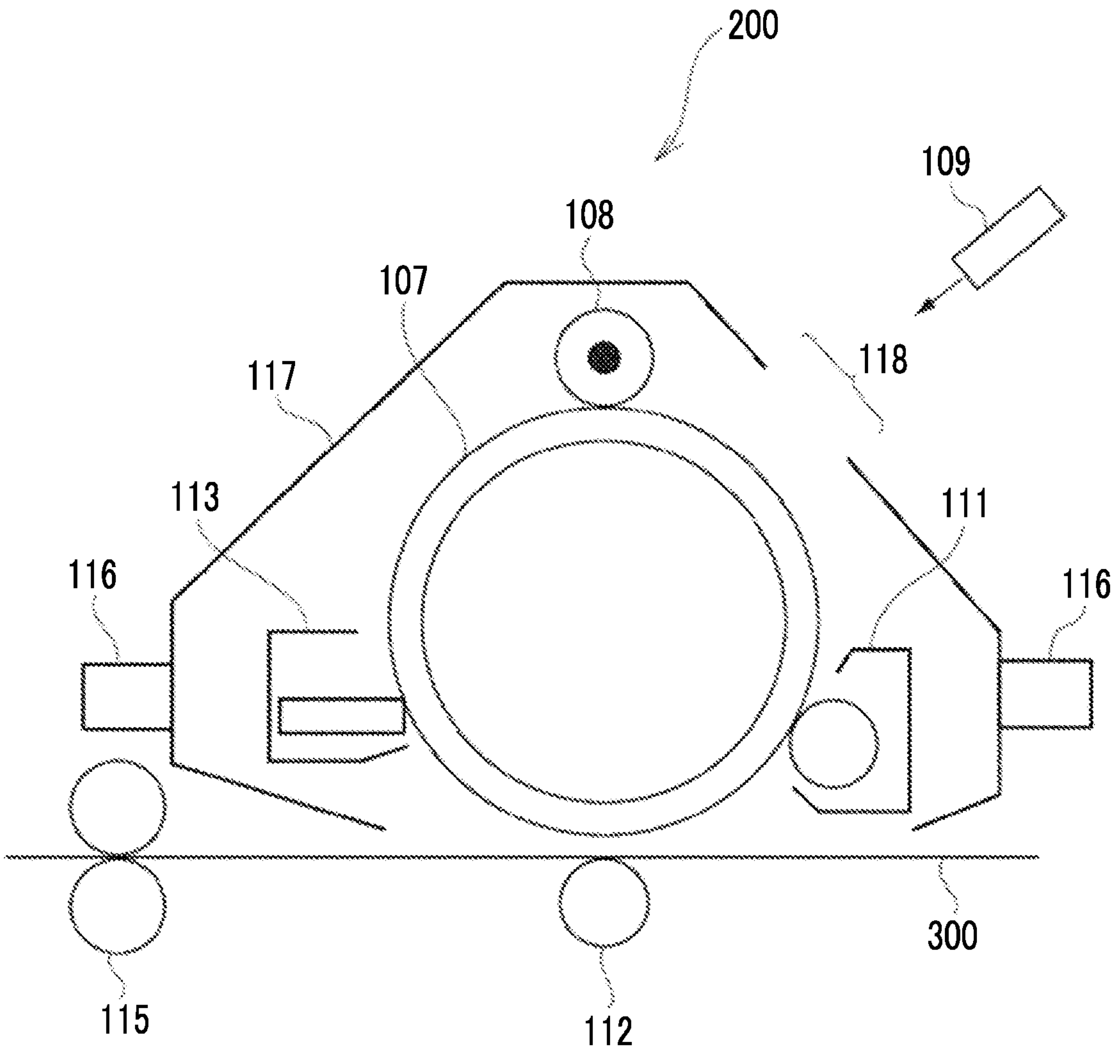
FIG. 2 is a view schematically showing the configuration of a process cartridge according to the present exemplary embodiment.

FIG. 2 is a view schematically showing the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of image holder), a charging roll 108 (an example of charging unit) that is provided on the periphery of the photoreceptor 107, a developing device 111 (an example of developing unit), a photoreceptor cleaning device 113 (an example of cleaning unit), which are integrally combined and held in the housing 117. The process cartridge 200 forms a cartridge in this way.

In FIG. 2, 109 represents an exposure device (an example of electrostatic charge image forming unit), 112 represents a transfer device (an example of transfer unit), 115 represents a fixing device (an example of fixing unit), and 300 represents recording paper (an example of recording medium).

Next, the toner cartridge according to the present exemplary embodiment will be described.

The toner cartridge according to the present exemplary embodiment is a toner cartridge including a container that contains the toner according to the present exemplary embodiment and is detachable from the image forming apparatus. The toner cartridge includes a container that contains a replenishing toner to be supplied to the developing unit provided in the image forming apparatus.

The image forming apparatus shown in FIG. 1 is an image forming apparatus having a configuration that enables toner cartridges 8Y, 8M, 8C, and 8K to be detachable from the apparatus. The developing devices 4Y, 4M, 4C, and 4K are connected to toner cartridges corresponding to the respective developing devices (colors) by a toner supply pipe not shown in the drawing. In a case where the amount of the toner contained in the container of the toner cartridge is low, the toner cartridge is replaced.

EXAMPLES

Examples will be described below, but the present invention is not limited to these examples. In the following description, unless otherwise specified, "parts" and "%" are based on mass in all cases.

Preparation of Toner Particles

Preparation of Amorphous Polyester Resin Dispersion (A1)

Ethylene glycol: 37 parts
Neopentyl glycol: 65 parts
1,9-Nonanediol: 32 parts
Terephthalic acid: 96 parts The above materials are put in a reaction vessel, the temperature is raised to 200° C. for 1 hour, and after it is confirmed that the inside of the reaction system is uniformly stirred, 1.2 parts of dibutyltin oxide is added. The temperature is raised to 240° C. for 6 hours in a state where the generated water is distilled off, and stirring is continued at 240° C. for 4 hours, thereby obtaining an amorphous polyester resin (acid value 9.4 mgKOH/g, weight-average molecular weight 13,000, glass transition temperature 62° C.). Molten amorphous polyester resin is transferred as it is to an emulsifying disperser (CAVITRON CD1010, Eurotech Ltd.) at a rate of 100 g/min. Separately, dilute aqueous ammonia having a concentration of 0.37% obtained by diluting the reagent aqueous ammonia with deionized water is put in a tank and transferred to an emulsifying disperser together with the amorphous polyester resin at a rate of 0.1 L/min while being heated at 120° C. by a heat exchanger. The emulsifying disperser is operated under the conditions of a rotation speed of a rotor of 60 Hz and a pressure of 5 kg/cm$^2$, thereby obtaining an amorphous polyester resin dispersion (A1) having a volume-average particle size of 160 nm and a solid content of 20%.

Preparation of Crystalline Polyester Resin Dispersion (C1)

Decanedioic acid: 81 parts
Hexanediol: 47 parts

The above materials are put in a reaction vessel, the temperature is raised to 160° C. for 1 hour, and after it is confirmed that the inside of the reaction system is uniformly stirred, 0.03 parts of dibutyltin oxide is added. While the generated water is distilled off, the temperature is raised to 200° C. for 6 hours, and stirring is continued for 4 hours at 200° C. Thereafter, the reaction solution is cooled, solid-liquid separation is performed, and the solid is dried at a temperature of 40° C. under reduced pressure, thereby obtaining a crystalline polyester resin (C1) (melting point 64° C., weight-average molecular weight of 15,000).

Crystalline polyester resin (C1): 50 parts
Anionic surfactant (manufactured by DKS Co. Ltd., NEOGEN RK): 2 parts
Deionized water: 200 parts The above materials are heated to 120° C., thoroughly dispersed with a homogenizer (ULTRA-TURRAX T50, manufactured by IKA), and then subjected to a dispersion treatment with a pressure jet-type homogenizer. At a point in time when the volume-average particle size reaches 180 nm, the dispersed resultant is collected, thereby obtaining a crystalline polyester resin dispersion (C1) having a solid content of 20%.

Preparation of Release Agent Particle Dispersion (W1)

Paraffin wax (manufactured by NIPPON SEIRO CO., LTD., HNP-9): 100 parts
Anionic surfactant (manufactured by DKS Co. Ltd., NEOGEN RK): 1 part
Deionized water: 350 parts The above materials are mixed together, heated to 100° C., and dispersed using a homogenizer (ULTRA-TURRAX T50 manufactured by IKA). By using a pressure jet-type Gorlin homogenizer, a dispersion treatment is performed, thereby obtaining a release agent particle dispersion in which release agent particles having a volume-average particle size of 200 nm are dispersed. Deionized water is added to the release agent particle dispersion such that the solid content thereof is adjusted to 20%, thereby obtaining a release agent particle dispersion (W1).

Preparation of Colorant Particle Dispersion (C1)

Cyan pigment (Pigment Blue 15:3, Dainichiseika Color & Chemicals Mfg. Co., Ltd.): 50 parts
Anionic surfactant (manufactured by DKS Co. Ltd., NEOGEN RK): 5 parts
Deionized water: 195 parts The above materials are mixed together and subjected to a dispersion treatment for 60 minutes by using a high-pressure impact disperser (ULTIMIZER HJP30006, manufactured by SUGINO MACHINE LIMITED), thereby obtaining a colorant particle dispersion (C1) having a solid content of 20%.

Preparation of Toner Particles

Deionized water: 200 parts
Amorphous polyester resin dispersion (A1): 150 parts
Crystalline polyester resin dispersion (C1): 10 parts
Release agent particle dispersion (W1): 10 parts
Colorant particle dispersion (C1): 15 parts
Anionic surfactant (TaycaPower): 2.8 parts The above materials are put in a reaction vessel, 0.1N nitric acid is added thereto to adjust the pH to 3.5, and then an aqueous polyaluminum chloride solution obtained by dissolving 2 parts of polyaluminum chloride (manufactured by Oji Paper Co., Ltd., 30% powder product) in 30 parts of deionized water is added thereto. The obtained solution is dispersed at 30° C. by using a homogenizer (ULTRA-TURRAX T50 manufactured by IKA), heated to 45° C. in an oil bath for heating, and retained until the volume-average particle size reaches 4.9 Next, 60 parts of the amorphous polyester resin dispersion (A1) is added thereto, and the mixture is retained for 30 minutes. Thereafter, at a point in time when the volume-average particle size reaches 5.2 μm 60 parts of the amorphous polyester resin dispersion (A1) is further added thereto, and the mixture is retained for 30 minutes. Subsequently, 20 parts of a 10% aqueous solution of NTA (nitrilotriacetic acid) metal salt (CHELEST 70, manufactured by CHELEST CORPORATION) is added thereto, and a 1N aqueous sodium hydroxide solution is added thereto to adjust the pH to 9.0. Thereafter, 1 part of an anionic surfactant (TaycaPower) is added thereto, and the mixture is heated to 85° C. while being continuously stirred and retained for 5 hours. The mixture is then cooled to 20° C. at a rate of 20° C./min. Thereafter, the mixture is filtered, thoroughly washed with deionized water, and dried, thereby obtaining toner particles having a volume-average particle size of 5.7 μm and an average circularity of 0.971.

Preparation of Alkylsilane-Treated Silica Particles

Alkylsilane-Treated Silica Particles (S1)

Preparation of Silica Base Particles

Methanol (255 parts) and 33 parts of 10% aqueous ammonia are added to a 1.5 L glass reaction vessel equipped with a stirrer, a dripping nozzle, and a thermometer, followed by mixing, thereby obtaining a mixed solution. The temperature of the mixed solution is adjusted to 25° C., and then 153 parts of tetramethoxysilane and 49 parts of 3.8% aqueous ammonia are added dropwise thereto at the same addition start point for 60 minutes under stirring, thereby obtaining 420 parts of a hydrophilic silica particle dispersion.

Thereafter, 420 parts of methanol is added to the hydrophilic silica particle dispersion, and the mixture is heated at 60° C. under stirring until the dispersion is concentrated to a mass of 420 parts. The operation is repeated twice more, thereby obtaining a concentrated dispersion. The weight ratio of silica in the concentrated dispersion is adjusted to 50%, and the weight ratio of water to alcohol in the concentrated dispersion is adjusted to 0, thereby obtaining a silica base particle dispersion.

Alkylsilane Treatment

The silica dispersion is subjected to a solvent removal treatment and an alkylsilane treatment as shown below.

An apparatus equipped with an autoclave with a stirrer (volume: 500 ml) and a back pressure valve is prepared, and 400 parts of the silica base particle dispersion is added to the autoclave. Thereafter, the autoclave is filled with liquefied carbon dioxide. Next, the stirrer is operated at 200 rpm, the autoclave is heated to 150° C. by a heater, and then the pressure is raised to 20 MPa by a carbon dioxide pump. In this way, supercritical carbon dioxide is circulated in the autoclave such that the solvent of the silica base particle dispersion is removed. A trapping device is kept at 0° C. by a refrigerant such that the removed solvent can be separated from carbon dioxide. The flow rate of carbon dioxide is measured with a gas flow meter.

Subsequently, at a point in time when the circulation amount of the supercritical carbon dioxide that has been circulated (integrated value: measured as the circulation amount of carbon dioxide in the standard state) reaches 20 L, the circulation of the supercritical carbon dioxide is stopped, and then trimethylmethoxysilane as an alkylsilane is added thereto such that the alkylsilane-treated silica particles have a surface treatment amount of the alkylsilane of 30% by mass. Next, as the cyclic siloxane, dodecamethylcyclohexanesiloxane is added thereto such that the content of the cyclic siloxane is 120 ppm with respect to the total mass of the alkylsilane-treated silica particles.

Thereafter, the temperature is kept at 150° C. by the heater and the pressure is kept at 20 MPa by the carbon dioxide pump such that the supercritical state of the carbon dioxide in the autoclave is maintained. In this state, the stirrer is operated at 200 rpm, and the particles are retained for 30 minutes as a hydrophobic treatment time. After the particles are retained for 30 minutes, supercritical carbon dioxide is circulated again, the back pressure valve is opened such that the pressure is reduced to the atmospheric pressure, and the particles are cooled to room temperature. Thereafter, alkylsilane-treated silica particles (S1) are taken out of the autoclave.

Alkylsilane-Treated Silica Particles (S2) to (S15)

Alkylsilane-treated silica particles are obtained by the same procedure as in the alkylsilane-treated silica particles (S1), except that the type of alkylsilane and the type of cyclic siloxane are changed as shown in Table 1, the amount of the alkylsilane added is changed such that the surface treatment amount of the alkylsilane of the alkylsilane-treated silica particles is as shown in Table 1, and the amount of the cyclic siloxane added is changed such that the content of the cyclic siloxane with respect to the total mass of the alkylsilane-treated silica particles is as shown in Table 1.

TABLE 1

| Type of alkylsilane-treated silica particles | Alkylsilane | | Cyclic siloxane | |
|---|---|---|---|---|
| | Type | Surface treatment amount of alkylsilane | Type | Content of cyclic siloxane with respect to total amount of alkylsilane-treated silica particles |
| S1 | Trimethylmethoxysilane | 25% | Dodecamethylcyclohexanesiloxane | 130 ppm |
| S2 | Methyltrimethoxysilane | 25% | Dodecamethylcyclohexanesiloxane | 130 ppm |
| S3 | Methyltrimethoxysilane | 25% | — | — |
| S4 | Hexyltrimethoxysilane | 25% | Dodecamethylcyclohexanesiloxane | 130 ppm |
| S5 | Triethylmethoxysilane | 25% | Dodecamethylcyclohexanesiloxane | 130 ppm |
| S6 | Methyltrimethoxysilane | 25% | Tetradecamethylcyclohepasiloxane | 130 ppm |
| S7 | Methyltrimethoxysilane | 25% | Dodecamethylcyclohexanesiloxane | 130 ppm |

TABLE 1-continued

| Type of alkylsilane-treated silica particles | Alkylsilane | | Cyclic siloxane | |
|---|---|---|---|---|
| | Type | Surface treatment amount of alkylsilane | Type | Content of cyclic siloxane with respect to total amount of alkylsilane-treated silica particles |
| S8 | Methyltrimethoxysilane | 5% | Dodecamethylcyclohexanesiloxane | 10 ppm |
| S9 | Methyltrimethoxysilane | 5% | Dodecamethylcyclohexanesiloxane | 8 ppm |
| S10 | Methyltrimethoxysilane | 40% | Dodecamethylcyclohexanesiloxane | 1000 ppm |
| S11 | Methyltrimethoxysilane | 40% | Dodecamethylcyclohexanesiloxane | 1100 ppm |
| S12 | Methyltrimethoxysilane | 50% | Dodecamethylcyclohexanesiloxane | 50 ppm |
| S13 | Methyltrimethoxysilane | 50% | Dodecamethylcyclohexanesiloxane | 25 ppm |
| S14 | Methyltrimethoxysilane | 10% | Dodecamethylcyclohexanesiloxane | 1000 ppm |
| S15 | Methyltrimethoxysilane | 8.5% | Dodecamethylcyclohexanesiloxane | 1000 ppm |

Alkylsilane-Treated Silica Particles (S16) to (S24)

Alkylsilane-treated silica particles are obtained by the same procedure as in the alkylsilane-treated silica particles (S2), except that, in Production of Silica Base Particles, the amount of 3.8% aqueous ammonia added and the amount of tetramethoxysilane (denoted as "TMOS" in Table 2) added are changed as shown in Table 2.

TABLE 2

| | Added amount of 3.8% aqueous ammonia (part by mass) | Added amount of TMOS (part by mass) |
|---|---|---|
| S16 | 35 | 130 |
| S17 | 43 | 160 |
| S18 | 43 | 160 |
| S19 | 41 | 160 |
| S20 | 35 | 130 |
| S21 | 62 | 180 |
| S22 | 62 | 180 |
| S23 | 35 | 130 |
| S24 | 35 | 130 |

Production of Strontium Titanate Particles

Strontium Titanate Particles (1)

Metatitanic acid which is a desulfurized and deflocculated titanium source is collected in an amount of 0.7 mol as $TiO_2$ and put in a reaction vessel. Next, 0.77 mol of an aqueous strontium chloride solution is added to the reaction vessel such that the molar ratio of $SrO/TiO_2$ is 1.1. Thereafter, a solution obtained by dissolving lanthanum oxide in nitric acid is added to the reaction vessel, in an amount that makes the amount of lanthanum to 2.5 mol with respect to 100 mol of strontium. The initial $TiO_2$ concentration in the mixed solution of the three materials is adjusted to 0.75 mol/L. Next, the mixed solution is stirred and heated to 90° C., 153 mL of a 10N aqueous sodium hydroxide solution is added thereto for 0.7 hours in a state where the mixed solution is stirred at a liquid temperature kept at 90° C., and the obtained reaction solution is continuously stirred for 1 hour at a liquid temperature kept at 90° C. Next, the reaction solution is cooled to 40° C., hydrochloric acid is added thereto until the pH reaches 5.5, and the reaction solution is stirred for 1 hour. Next, decantation and redispersion in water are repeated to wash the precipitate. Hydrochloric acid is added to the slurry containing the washed precipitate such that the pH is adjusted to 6.5, solid-liquid separation is performed by filtration, and the solids are dried. i-Butyltrimethoxysilane in an ethanol solution is added to the dried solids, in an amount that makes the amount of the i-butyltrimethoxysilane be 20 parts with respect to 100 parts of the solids, followed by stirring for 1 hour. Solid-liquid separation is performed by filtration, and the solids are dried in the air at 130° C. for 7 hours, thereby obtaining strontium titanate particles (1).

Strontium Titanate Particles (2)

Strontium titanate particles (2) are produced in the same manner as in the production of the strontium titanate particles (1), except that the time taken for adding 10N aqueous sodium hydroxide solution dropwise is changed to 1 hour.

Strontium Titanate Particles (3)

Strontium titanate particles (3) are produced in the same manner as in the production of the strontium titanate particles (1), except that the time taken for adding 10N aqueous sodium hydroxide solution dropwise is changed to 3 hours.

Strontium Titanate Particles (4)

Strontium titanate particles (4) are produced in the same manner as in the production of the strontium titanate particles (1), except that the time taken for adding 10N aqueous sodium hydroxide solution dropwise is changed to 9.5 hours.

Strontium Titanate Particles (5)

Strontium titanate particles (5) are produced in the same manner as in the production of the strontium titanate particles (1), except that the time taken for adding 10N aqueous sodium hydroxide solution dropwise is changed to 12 hours.

Strontium Titanate Particles (6)

Strontium titanate particles (6) are produced in the same manner as in the production of the strontium titanate particles (1), except that the time taken for adding 10N aqueous sodium hydroxide solution dropwise is changed to 15 hours.

Example 1: Production of Toner and Developer

The alkylsilane-treated silica particles (S1) (2 parts) are added to 100 parts of the toner particles, followed by mixing using a Henschel mixer at a circumferential speed of stirring of 30 m/sec for 15 minutes, thereby obtaining toners.

Each of the obtained toners and the following resin-coated carrier is put in a V blender at a ratio of toner:carrier=8:92 (mass ratio) and stirred for 20 minutes, thereby obtaining a developer.

Carrier

- Mn—Mg—Sr-based ferrite particles (average particle size: 40 μm): 100 parts
- Toluene: 14 parts
- Polymethyl methacrylate: 2 parts
- Carbon black (VXC72: manufactured by Cabot Corporation): 0.12 parts The above materials excluding ferrite particles are mixed with glass beads (diameter: 1 mm, in the same amount as toluene), and the mixture is stirred with a sand mill manufactured by Kansai Paint Co., Ltd. at a rotation speed of 1,200 rpm for 30 minutes, thereby obtaining a dispersion. The dispersion and the ferrite particles are put in a vacuum deaeration-type kneader and dried under reduced pressure with stirring, thereby obtaining a resin-coated carrier.

Examples 2 to 29 and Comparative Example 1

Toners and developers are obtained by the same procedure as in Example 1, except that the type of alkylsilane-treated silica particles added to the toner particles and the type and amount of strontium titanate particles added are changed as shown in Table 3.

In a case of producing a toner containing the strontium titanate particles, the strontium titanate particles are added to the toner particles together with the alkylsilane-treated silica particles during the production of the toner, and are mixed using a Henschel mixer.

Evaluation

The developer obtained in each example is put in an image forming apparatus DCC400 (manufactured by FUJIFILM Business Innovation Corp.) in which a density sensor is canceled, and a solid image (image density: 100%) of A3 size is printed on 10 sheets under an environment of 10° C. and 15% RH. Thereafter, printing of blank paper (image density: 0%) is repeated, and a total of 100,000 blank papers are printed. Subsequently, one sheet of blank paper is printed, the number of streaky stains generated on the blank paper is confirmed, and evaluation is performed according to the following evaluation standard.

Evaluation Standard

G1: the number of streaky stains is less than 5.

G1.5: the number of streaky stains is 5 or more and less than 10.

G2: the number of streaky stains is 10 or more and less than 20.

G2.5: the number of streaky stains is 20 or more and less than 30.

G3: the number of streaky stains is 30 or more and less than 50.

G3.5: the number of streaky stains is 50 or more and less than 70.

G4: the number of streaky stains is 70 or more and less than 90.

G4.5: the number of streaky stains is 90 or more and less than 110.

G5: the number of streaky stains is 110 or more.

TABLE 3

| | Alkylsilane-treated silica particles | | | | | Cyclic siloxane | |
|---|---|---|---|---|---|---|---|
| | Type | Added amount (part) | Alkylsilane Type | Alkylsilane % | Average primary particle size (nm) | Type | Number of siloxane units |
| Example 1 | S1 | 2 | Trimethylmethoxysilane | 25 | 100 | Dodecamethylcyclohexanesiloxane | 6 |
| Example 2 | S2 | 2 | Methyltrimethoxysilane | 25 | 100 | Dodecamethylcyclohexanesiloxane | 6 |
| Comparative Example 1 | S3 | 2 | Methyltrimethoxysilane | 25 | 100 | — | — |
| Example 3 | S4 | 2 | Hexyltrimethoxysilane | 25 | 100 | Dodecamethylcyclohexanesiloxane | 6 |
| Example 4 | S5 | 2 | Triethylmethoxysilane | 25 | 100 | Dodecamethylcyclohexanesiloxane | 6 |
| Example 5 | S2 | 2 | Methyltrimethoxysilane | 25 | 100 | Hexamethylcyclosiloxane | 3 |
| Example 6 | S6 | 2 | Methyltrimethoxysilane | 25 | 100 | Tetradecamethylcycloheptasiloxane | 7 |
| Example 7 | S7 | 2 | Methyltrimethoxysilane | 25 | 100 | Dodecaethylcyclohexanesiloxane | 6 |
| Example 8 | S8 | 2 | Methyltrimethoxysilane | 5 | 100 | Dodecamethylcyclohexanesiloxane | 6 |
| Example 9 | S9 | 2 | Methyltrimethoxysilane | 5 | 100 | Dodecamethylcyclohexanesiloxane | 6 |
| Example 10 | S10 | 2 | Methyltrimethoxysilane | 40 | 100 | Dodecamethylcyclohexanesiloxane | 6 |
| Example 11 | S11 | 2 | Methyltrimethoxysilane | 40 | 100 | Dodecamethylcyclohexanesiloxane | 6 |
| Example 12 | S12 | 2 | Methyltrimethoxysilane | 50 | 100 | Dodecamethylcyclohexanesiloxane | 6 |
| Example 13 | S13 | 2 | Methyltrimethoxysilane | 50 | 100 | Dodecamethylcyclohexanesiloxane | 6 |
| Example 14 | S14 | 2 | Methyltrimethoxysilane | 10 | 100 | Dodecamethylcyclohexanesiloxane | 6 |
| Exemple 15 | S15 | 2 | Methyltrimethoxysilane | 8.5 | 100 | Dodecamethylcyclohexanesiloxane | 6 |
| Example 16 | S16 | 2 | Methyltrimethoxysilane | 25 | 45 | Dodecamethylcyclohexanesiloxane | 6 |
| Example 17 | S17 | 2 | Methyltrimethoxysilane | 25 | 63 | Dodecamethylcyclohexanesiloxane | 6 |
| Example 18 | S18 | 2 | Methyltrimethoxysilane | 25 | 65 | Dodecamethylcycichexanesiloxane | 7 |
| Example 19 | S19 | 2 | Methyltrimethoxysilane | 25 | 57 | Dodecamethylcyclohexanesiloxane | 6 |
| Example 20 | S20 | 2 | Methyltrimethoxysilane | 25 | 50 | Dodecamethylcyclohexanesiloxane | 6 |
| Example 21 | S2 | 2 | Methyltrimethoxysilane | 25 | 100 | Dodecamethylcyclohexanesiloxane | 6 |
| Example 22 | S21 | 2 | Methyltrimethoxysilane | 25 | 180 | Dodecamethylcyclohexanesiloxane | 6 |
| Example 23 | S22 | 2 | Methyltrimethoxysilane | 25 | 184 | Dodecamethylcyclohexanesiloxane | 6 |
| Example 24 | S23 | 2 | Methyltrimethoxysilane | 25 | 49 | Dodecamethylcyclohexanesiloxane | 6 |
| Example 25 | S24 | 2 | Methyltrimethoxysilane | 25 | 45 | Dodecamethylcyclohexanesiloxane | 6 |
| Example 26 | S2 | 2 | Methyltrimethoxysilane | 25 | 100 | Dodecamethylcyclohexanesiloxane | 6 |
| Example 27 | S2 | 2 | Methyltrimethoxysilane | 25 | 100 | Dodecamethylcyclohexanesiloxane | 6 |
| Example 28 | S2 | 2 | Methyltrimethoxysilane | 25 | 100 | Dodecamethylcyclohexanesiloxane | 6 |
| Example 29 | S2 | 2 | Methyltrimethoxysilane | 25 | 100 | Dodecamethylcyclohexanesiloxane | 6 |

TABLE 3-continued

| | Cyclic siloxane | | | Strontium titanate particles | | | Particle | | |
|---|---|---|---|---|---|---|---|---|---|
| | Content with respect to silica particle (ppm) | Contained place | Ratio (amount of CSi/ amount of AlSi) | Type | Added amount (part) | Average primary particle size (nm) | size of $SrTiO_3$/ particle size of $SiO_2$ | Amount of $SrTiO_3$/ amount of $SiO_2$ | Evaluation |
| Example 1 | 130 | Silica particles | 0.0005 | 3 | 1 | 40 | 0.4 | 0.5 | G1 |
| Example 2 | 130 | Silica particles | 0.0005 | 3 | 1 | 40 | 0.4 | 0.5 | G1 |
| Comparative Example 1 | — | — | 0.0000 | 3 | 1 | 40 | 0.4 | 0.5 | G5 |
| Example 3 | 130 | Silica particles | 0.0005 | 3 | 1 | 40 | 0.4 | 0.5 | G2.5 |
| Example 4 | 130 | Silica particles | 0.0005 | 3 | 1 | 40 | 0.4 | 0.5 | G2 |
| Example 5 | 130 | Silica particles | 0.0005 | 3 | 1 | 40 | 0.4 | 0.5 | G2 |
| Example 6 | 130 | Silica particles | 0.0005 | 3 | 1 | 40 | 0.4 | 0.5 | G3 |
| Example 7 | 130 | Silica particles | 0.0005 | 3 | 1 | 40 | 0.4 | 0.5 | G2 |
| Example 8 | 10 | Silica particles | 0.0002 | 3 | 1 | 40 | 0.4 | 0.5 | G2 |
| Example 9 | 8 | Silica particles | 0.0002 | 3 | 1 | 40 | 0.4 | 0.5 | G2.5 |
| Example 10 | 1000 | Silica particles | 0.0025 | 3 | 1 | 40 | 0.4 | 0.5 | G2 |
| Example 11 | 1100 | Silica particles | 0.0028 | 3 | 1 | 40 | 0.4 | 0.5 | G2.5 |
| Example 12 | 50 | Silica particles | 0.0001 | 3 | 1 | 40 | 0.4 | 0.5 | G2 |
| Example 13 | 25 | Silica particles | 0.00005 | 3 | 1 | 40 | 0.4 | 0.5 | G2.5 |
| Example 14 | 1000 | Silica particles | 0.01 | 3 | 1 | 40 | 0.4 | 0.5 | G2 |
| Exemple 15 | 1000 | Silica particles | 0.012 | 3 | 1 | 40 | 0.4 | 0.5 | G2.5 |
| Example 16 | 130 | Silica particles | 0.0005 | 1 | 1 | 18 | 0.4 | 0.5 | G2 |
| Example 17 | 130 | Silica particles | 0.0005 | 2 | 1 | 25 | 0.4 | 0.5 | G1 |
| Example 18 | 130 | Silica particles | 0.0005 | 6 | 1 | 98 | 1.5 | 0.5 | G3 |
| Example 19 | 130 | Silica particles | 0.0005 | 5 | 1 | 85 | 1.5 | 0.5 | G2.5 |
| Example 20 | 130 | Silica particles | 0.0005 | 4 | 1 | 75 | 1.5 | 0.5 | G2 |
| Example 21 | 130 | Silica particles | 0.0005 | — | — | — | — | — | G3 |
| Example 22 | 130 | Silica particles | 0.0005 | 1 | 1 | 18 | 0.1 | 0.5 | G2.5 |
| Example 23 | 130 | Silica particles | 0.0005 | 1 | 1 | 18 | 0.098 | 0.5 | G2 |
| Example 24 | 130 | Silica particles | 0.0005 | 6 | 1 | 98 | 2 | 0.5 | G2 |
| Example 25 | 130 | Silica particles | 0.0005 | 6 | 1 | 98 | 2.2 | 0.5 | G2.5 |
| Example 26 | 130 | Silica particles | 0.0005 | 3 | 0.02 | 40 | 0.4 | 0.01 | G1.5 |
| Example 27 | 130 | Silica particles | 0.0005 | 3 | 0.01 | 40 | 0.4 | 0.005 | G2 |
| Example 28 | 130 | Silica particles | 0.0005 | 3 | 2 | 40 | 0.4 | 1 | G1.5 |
| Example 29 | 130 | Silica particles | 0.0005 | 3 | 2.4 | 40 | 0.4 | 1.2 | G2 |

The description in Table 3 is as below.

Abbreviations for types of alkylsilanes and types of cyclic siloxane: same as abbreviations in Table 1

"Content with respect to silica particles (ppm)" described in the column under cyclic siloxane: content of cyclic siloxane with respect to total amount of alkylsilane-treated silica particles Ratio (amount of CSi/amount of AlSi): ratio of content of the cyclic siloxane to surface treatment amount of the alkylsilane (content of cyclic siloxane/surface treatment amount of alkylsilane)

$SrTiO_3$ particle size/$SiO_2$ particle size: average primary particle size of the strontium titanate particles with respect to the average primary particle size of the silica particles (average primary particle size of strontium titanate particles/average primary particle size of silica particles)

$SrTiO_3$ amount/$SiO_2$ amount: content of the strontium titanate particles with respect to the content of the silica particles (content of strontium titanate particles/content of silica particles)

From the above results, it is found that, in the toners of Examples, defective cleaning of an image holder in a case where an image having a high image density is formed continuously and at high speed is suppressed.

(((1))) An electrostatic charge image developing toner comprising:

alkylsilane-treated silica particles;

cyclic siloxane; and toner particles.

(((2))) The electrostatic charge image developing toner according to (((1))), wherein the alkylsilane is at least one kind of compound selected from the group consisting of alkylsilanes represented by Formula (1), Formula (2), and Formula (3), Formula (1)

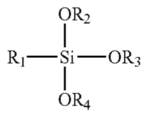

Formula (2)

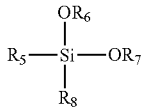

Formula (3)

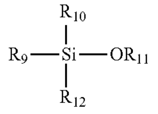

(in Formula (1) to Formula (3), $R_1$ to $R_{12}$ each independently represent an alkyl group having 1 or more and 3 or less carbon atoms).

(((3))) The electrostatic charge image developing toner according to (((2))), wherein all of alkyl groups of the alkylsilane are methyl groups.

(((4))) The electrostatic charge image developing toner according to any one of (((1))) to (((3))), wherein the number of siloxane units constituting a cyclic structure of the cyclic siloxane is 3 or more and 6 or less.

(((5))) The electrostatic charge image developing toner according to (((4))), wherein the cyclic siloxane having 3 or more and 6 or less siloxane units has a methyl group.

(((6))) The electrostatic charge image developing toner according to any one of (((1))) to (((5))), wherein a content of the cyclic siloxane is 10 ppm or more and 1,000 ppm or less with respect to a total amount of the silica particles.

(((7))) The electrostatic charge image developing toner according to any one of (((1))) to (((6))), wherein a ratio of a content of the cyclic siloxane to a surface treatment amount of the alkylsilane (content of cyclic siloxane/surface treatment amount of alkylsilane) is 0.0001 or more and 0.01 or less.

(((8))) The electrostatic charge image developing toner according to any one of (((1))) to (((7))), wherein the cyclic siloxane is contained in the silica particles.

(((9))) The electrostatic charge image developing toner according to any one of (((1))) to (((8))), further comprising:

strontium titanate particles having an average primary particle size of 10 nm or more and 100 nm or less.

(((10))) The electrostatic charge image developing toner according to (((9))), wherein the average primary particle size of the strontium titanate particles with respect to an average primary particle size of the silica particles (average primary particle size of strontium titanate particles/average primary particle size of silica particles) is 0.01 or more and 2.0 or less.

(((11))) The electrostatic charge image developing toner according to (((9))) or (((10))), wherein a content of the strontium titanate particles with respect to a content of the silica particles (content of strontium titanate particles/content of silica particles) is 0.01 or more and 1.0 or less.

(((12))) An electrostatic charge image developer comprising:

the electrostatic charge image developing toner according to any one of (((1))) to (((11))).

(((13))) A toner cartridge comprising:

a container that contains the electrostatic charge image developing toner according to any one of (((1))) to (((11))), wherein the toner cartridge is detachable from an image forming apparatus.

(((14))) A process cartridge comprising:

a developing unit that contains the electrostatic charge image developer according to (((12))) and develops an electrostatic charge image formed on a surface of an image holder as a toner image by using the electrostatic charge image developer, wherein the process cartridge is detachable from an image forming apparatus.

(((15))) An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according (((12))) and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

alkylsilane-treated silica particles;

cyclic siloxane, wherein the cyclic siloxane is contained in the alkylsilane-treated silica particles; and toner particles.

2. The electrostatic charge image developing toner according to claim 1, wherein the alkylsilane is at least one kind of compound selected from the group consisting of alkylsilanes represented by Formula (1), Formula (2), and Formula (3), Formula (1)

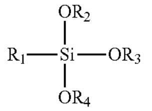

Formula (2)

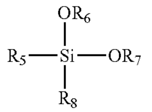

Formula (3)

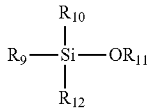

in Formula (1) to Formula (3), $R_1$ to $R_{12}$ each independently represent an alkyl group having 1 or more and 3 or less carbon atoms.

3. The electrostatic charge image developing toner according to claim 2, wherein all of alkyl groups of the alkylsilane are methyl groups.

4. The electrostatic charge image developing toner according to claim 1, wherein the number of siloxane units constituting a cyclic structure of the cyclic siloxane is 3 or more and 6 or less.

5. The electrostatic charge image developing toner according to claim 4, wherein the cyclic siloxane having 3 or more and 6 or less siloxane units has a methyl group.

6. The electrostatic charge image developing toner according to claim 1, wherein a content of the cyclic siloxane is 10 ppm or more and 1,000 ppm or less with respect to a total amount of the alkylsilane-treated silica particles.

7. The electrostatic charge image developing toner according to claim 1, wherein a ratio of a content of the cyclic siloxane to a surface treatment amount of the alkylsilane (content of cyclic siloxane/surface treatment amount of alkylsilane) is 0.0001 or more and 0.01 or less.

8. The electrostatic charge image developing toner according to claim 1, further comprising:

strontium titanate particles having an average primary particle size of 10 nm or more and 100 nm or less.

9. The electrostatic charge image developing toner according to claim 8, wherein the average primary particle size of the strontium titanate particles with respect to an average primary particle size of the alkylsilane-treated silica particles (average primary particle size of strontium titanate particles/average primary particle size of alkylsilane-treated silica particles) is 0.01 or more and 2.0 or less.

10. The electrostatic charge image developing toner according to claim 8, wherein a content of the strontium titanate particles with respect to a content of the alkylsilane-treated silica particles (content of strontium titanate particles/content of alkylsilane-treated silica particles) is 0.01 or more and 1.0 or less.

11. An electrostatic charge image developer comprising:

the electrostatic charge image developing toner according to claim 1.

12. An electrostatic charge image developer comprising:

the electrostatic charge image developing toner according to claim 2.

13. An electrostatic charge image developer comprising:

the electrostatic charge image developing toner according to claim 3.

14. An electrostatic charge image developer comprising:

the electrostatic charge image developing toner according to claim 4.

15. An electrostatic charge image developer comprising:

the electrostatic charge image developing toner according to claim 5.

16. An electrostatic charge image developer comprising:

the electrostatic charge image developing toner according to claim 6.

17. A toner cartridge comprising:

a container that contains the electrostatic charge image developing toner according to claim 1, wherein the toner cartridge is detachable from an image forming apparatus.

18. A process cartridge comprising:

a developing unit that contains the electrostatic charge image developer according to claim 11 and develops an electrostatic charge image formed on a surface of an image holder as a toner image by using the electrostatic charge image developer, wherein the process cartridge is detachable from an image forming apparatus.

19. An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to claim 11 and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

* * * * *